United States Patent
Adriani et al.

(10) Patent No.: US 9,657,967 B2
(45) Date of Patent: May 23, 2017

(54) ROTATABLE SUPPORT SYSTEM FOR MOUNTING ONE OR MORE PHOTOVOLTAIC MODULES

(71) Applicant: Alion Energy, Inc., Richmond, CA (US)

(72) Inventors: Paul Adriani, Palo Alto, CA (US); Neil Morris, Livermore, CA (US); Kevin Hennessy, Walnut Creek, CA (US); Anders Swahn, Tiburon, CA (US); Thomas Peter Hunt, Oakland, CA (US); Luis Francisco Castro Hernandez, Richmond, CA (US)

(73) Assignee: Alion Energy, Inc., Richmond, CA (US)

( * ) Notice: Subject to any disclaimer, the term of this patent is extended or adjusted under 35 U.S.C. 154(b) by 613 days.

(21) Appl. No.: 13/892,140

(22) Filed: May 10, 2013

(65) Prior Publication Data
US 2013/0305518 A1 Nov. 21, 2013

Related U.S. Application Data

(60) Provisional application No. 61/647,991, filed on May 16, 2012.

(51) Int. Cl.
*B23P 21/00* (2006.01)
*B23Q 15/00* (2006.01)
(Continued)

(52) U.S. Cl.
CPC ............. *F24J 2/5245* (2013.01); *F24J 2/523* (2013.01); *F24J 2/5237* (2013.01); *H01L 31/18* (2013.01);
(Continued)

(58) Field of Classification Search
CPC  F24J 2/523; F24J 2/5237; F24J 2/5245; F24J 2002/5277; F24J 2002/5281; H01L 31/18; H02S 20/00; H02S 20/30
(Continued)

(56) References Cited

U.S. PATENT DOCUMENTS 3,267,824 A    8/1966  Hudis
3,334,217 A    8/1967  Bickler et al.
(Continued)

FOREIGN PATENT DOCUMENTS

CN    101858659    10/2010
CN    202019322    10/2011
(Continued)

OTHER PUBLICATIONS

United States Patent and Trademark Office, Final office action dated. Oct. 7, 2014 for U.S. Appl. No. 13/195,562 (17 pages).
(Continued)

*Primary Examiner* — Paul D Kim
(74) *Attorney, Agent, or Firm* — Jones Day

(57) ABSTRACT

Rotatable support system for mounting one or more photovoltaic modules. The system includes a stiffener configured to be attached to the one or more photovoltaic modules, a column connected to the stiffener through at least a rotatable component, and a foot connected to the column. The column is configured to rotate from a folded position towards an unfolded position, and stop at the unfolded position separated from the folded position by an angle difference. The angle difference represents the maximum range of rotation for the column.

26 Claims, 24 Drawing Sheets

(51) Int. Cl.
*F24J 2/52* (2006.01)
*H01L 31/18* (2006.01)
*H02S 20/00* (2014.01)
*H02S 20/30* (2014.01)

(52) U.S. Cl.
CPC .............. *H02S 20/00* (2013.01); *H02S 20/30* (2014.12); *F24J 2002/5277* (2013.01); *F24J 2002/5281* (2013.01); *Y02E 10/47* (2013.01); *Y02E 10/50* (2013.01); *Y10T 29/49002* (2015.01)

(58) Field of Classification Search
USPC .................................. 29/721, 729, 739, 760
See application file for complete search history.

(56) References Cited

U.S. PATENT DOCUMENTS

| | | | |
|---|---|---|---|
| 3,516,340 A | 6/1970 | Perkins | |
| 3,540,360 A | 11/1970 | Snow et al. | |
| 3,951,506 A | 4/1976 | Bennett et al. | |
| 4,145,021 A | 3/1979 | Gaechter et al. | |
| 4,219,926 A | 9/1980 | Bloch et al. | |
| 4,279,347 A | 7/1981 | Appleman et al. | |
| 4,290,416 A | 9/1981 | Maloney et al. | |
| 4,296,270 A | 10/1981 | Kohler et al. | |
| 4,301,322 A | 11/1981 | Amick et al. | |
| 4,301,409 A | 11/1981 | Miller et al. | |
| 4,371,139 A | 2/1983 | Clark | |
| 4,421,943 A | 12/1983 | Withjack et al. | |
| 4,422,614 A | 12/1983 | Santos | |
| 4,496,063 A | 1/1985 | Ishii et al. | |
| 4,664,270 A | 5/1987 | Voelz | |
| 4,667,834 A | 5/1987 | Lanigan et al. | |
| 4,676,713 A | 6/1987 | Voelpel | |
| 4,706,825 A | 11/1987 | Johnson | |
| 4,876,143 A | 10/1989 | Sugita et al. | |
| 4,877,365 A | 10/1989 | Lanigan, Jr. et al. | |
| 4,880,346 A | 11/1989 | Brassette et al. | |
| 4,995,377 A | 2/1991 | Eiden et al. | |
| 5,125,608 A | 6/1992 | McMaster et al. | |
| 5,143,556 A | 9/1992 | Matlin | |
| 5,152,109 A | 10/1992 | Boers | |
| D335,541 S | 5/1993 | Rosario-Cartagena | |
| 5,228,924 A | 7/1993 | Barker et al. | |
| 5,232,519 A | 8/1993 | Glatfelter et al. | |
| 5,257,891 A | 11/1993 | Baumann et al. | |
| 5,361,704 A | 11/1994 | Bounds | |
| 5,460,660 A | 10/1995 | Albright et al. | |
| 5,501,744 A | 3/1996 | Albright et al. | |
| 5,505,788 A | 4/1996 | Dinwoodie | |
| 5,568,713 A | 10/1996 | Gagne et al. | |
| 5,593,901 A | 1/1997 | Oswald et al. | |
| 5,715,958 A | 2/1998 | Feider et al. | |
| 5,800,631 A | 9/1998 | Yamada et al. | |
| 5,816,769 A | 10/1998 | Bauer et al. | |
| 5,826,734 A | 10/1998 | Baumann et al. | |
| 6,037,578 A | 3/2000 | Grandjean et al. | |
| 6,046,399 A | 4/2000 | Kapner | |
| 6,058,930 A | 5/2000 | Shingleton | |
| 6,111,189 A | 8/2000 | Garvison et al. | |
| 6,201,181 B1 | 3/2001 | Azzam et al. | |
| 6,233,502 B1 | 5/2001 | Yim | |
| 6,495,750 B1 | 12/2002 | Dinwoodie | |
| 6,590,363 B2 | 7/2003 | Teramoto | |
| 6,639,421 B1 | 10/2003 | Yoshino et al. | |
| 6,722,357 B2 | 4/2004 | Shingleton | |
| 6,730,841 B2 | 5/2004 | Heckeroth | |
| 6,809,251 B2 | 10/2004 | Dinwoodie | |
| 7,086,675 B2 | 8/2006 | Jacobs | |
| 7,252,083 B2 | 8/2007 | Hayden | |
| 7,309,850 B2 | 12/2007 | Sinton et al. | |
| 7,374,137 B2 | 5/2008 | Staney | |
| 7,411,408 B2 | 8/2008 | Shimotomai et al. | |
| 7,476,832 B2 | 1/2009 | Vendig et al. | |
| 7,492,120 B2 | 2/2009 | Benn et al. | |
| 7,531,741 B1 | 5/2009 | Melton et al. | |
| 7,546,929 B2 | 6/2009 | Wierzba et al. | |
| 7,712,807 B2 | 5/2010 | Perlman et al. | |
| 7,799,987 B1 | 9/2010 | Hines et al. | |
| 7,814,899 B1 | 10/2010 | Port | |
| 7,888,588 B2 | 2/2011 | Shingleton | |
| 7,898,212 B2 | 3/2011 | Benn et al. | |
| 7,963,578 B2 | 6/2011 | Wells et al. | |
| 8,006,624 B2 | 8/2011 | Sin | |
| 8,203,237 B1 | 6/2012 | Cowles | |
| 8,245,459 B2 | 8/2012 | Belikoff et al. | |
| 8,371,076 B2 | 2/2013 | Jones et al. | |
| 8,407,950 B2 | 4/2013 | Hartelius | |
| 8,464,496 B2 | 6/2013 | Cusson et al. | |
| 8,492,645 B1 | 7/2013 | Strahm | |
| 8,500,918 B1 | 8/2013 | Meller et al. | |
| 8,550,419 B2 | 10/2013 | Hausner et al. | |
| 8,573,545 B2 | 11/2013 | Walquist et al. | |
| 8,578,928 B2 | 11/2013 | Lumbreras | |
| 8,607,512 B2 | 12/2013 | Batut | |
| 8,609,977 B2 | 12/2013 | Jones et al. | |
| 8,635,818 B2 | 1/2014 | Wildes | |
| 8,657,991 B2 | 2/2014 | Potter et al. | |
| 8,752,343 B2 | 6/2014 | Kuan et al. | |
| 8,962,972 B2 | 2/2015 | Sagayama | |
| 9,192,966 B2 | 11/2015 | Zanatta | |
| 9,355,873 B2 | 5/2016 | Eitelhuber | |
| 2003/0075211 A1 | 4/2003 | Makita et al. | |
| 2004/0250491 A1 | 12/2004 | Diaz et al. | |
| 2005/0061360 A1 | 3/2005 | Horioka et al. | |
| 2005/0268959 A1 | 12/2005 | Aschenbrenner et al. | |
| 2006/0054162 A1 | 3/2006 | Romeo | |
| 2006/0174931 A1 | 8/2006 | Mapes et al. | |
| 2006/0290344 A1 | 12/2006 | Shimotomai et al. | |
| 2007/0012352 A1 | 1/2007 | Wohlgemuth et al. | |
| 2007/0215145 A1 | 9/2007 | Hayden | |
| 2007/0283996 A1 | 12/2007 | Hachtmann et al. | |
| 2008/0010915 A1 | 1/2008 | Liebendorfer | |
| 2008/0023069 A1 | 1/2008 | Terada et al. | |
| 2008/0040990 A1 | 2/2008 | Vendig et al. | |
| 2008/0053517 A1 | 3/2008 | Plaisted et al. | |
| 2008/0087320 A1 | 4/2008 | Mapes et al. | |
| 2008/0099063 A1 | 5/2008 | Armstrong et al. | |
| 2008/0121273 A1 | 5/2008 | Plaisted et al. | |
| 2008/0135084 A1 | 6/2008 | Scharlack | |
| 2008/0156365 A1 | 7/2008 | Scholz et al. | |
| 2008/0233429 A1 | 9/2008 | Oguma et al. | |
| 2008/0271774 A1 | 11/2008 | Kalkanoglu et al. | |
| 2008/0306700 A1 | 12/2008 | Kawam et al. | |
| 2009/0014057 A1 | 1/2009 | Croft et al. | |
| 2009/0032100 A1 | 2/2009 | Oak | |
| 2009/0114261 A1 | 5/2009 | Stancel et al. | |
| 2009/0139557 A1 | 6/2009 | Rose et al. | |
| 2009/0173831 A1 | 7/2009 | Roseman | |
| 2009/0191030 A1 | 7/2009 | Bluck et al. | |
| 2009/0205270 A1 | 8/2009 | Shaw et al. | |
| 2009/0223142 A1 | 9/2009 | Shingleton et al. | |
| 2009/0260671 A1 | 10/2009 | Green et al. | |
| 2009/0282755 A1 | 11/2009 | Abbott et al. | |
| 2009/0293932 A1 | 12/2009 | Augenbraun et al. | |
| 2009/0293941 A1 | 12/2009 | Luch | |
| 2009/0308430 A1 | 12/2009 | Everett et al. | |
| 2010/0031996 A1 | 2/2010 | Basol | |
| 2010/0043781 A1 | 2/2010 | Jones et al. | |
| 2010/0108118 A1 | 5/2010 | Luch | |
| 2010/0127142 A1 | 5/2010 | Genschorek | |
| 2010/0147286 A1 | 6/2010 | Xiang et al. | |
| 2010/0175337 A1 | 7/2010 | Mascolo et al. | |
| 2010/0175738 A1 | 7/2010 | Huss et al. | |
| 2010/0206294 A1 | 8/2010 | Blair et al. | |
| 2010/0236183 A1 | 9/2010 | Cusson et al. | |
| 2010/0252092 A1 | 10/2010 | Lenox et al. | |
| 2010/0269429 A1 | 10/2010 | Belikoff et al. | |
| 2010/0269888 A1 | 10/2010 | Johnston, Jr. | |
| 2010/0269891 A1* | 10/2010 | Kinard | F24J 2/5205 136/251 |
| 2010/0275975 A1 | 11/2010 | Monschke et al. | |
| 2010/0281791 A1 | 11/2010 | Intagliata et al. | |

(56) References Cited

U.S. PATENT DOCUMENTS

| | | | |
|---|---|---|---|
| 2010/0319277 A1 | 12/2010 | Suarez et al. | |
| 2010/0325797 A1 | 12/2010 | Home | |
| 2011/0126378 A1 | 6/2011 | Ota | |
| 2011/0126884 A1 | 6/2011 | Dritsas | |
| 2011/0162691 A1 | 7/2011 | Hartelius | |
| 2011/0173900 A1 | 7/2011 | Plaisted et al. | |
| 2011/0183540 A1 | 7/2011 | Keenihan et al. | |
| 2011/0194900 A1 | 8/2011 | French | |
| 2011/0264306 A1 | 10/2011 | Bagge | |
| 2011/0284057 A1 | 11/2011 | Swahn et al. | |
| 2011/0309215 A1 | 12/2011 | Lu et al. | |
| 2012/0027550 A1 | 2/2012 | Bellacicco et al. | |
| 2012/0034799 A1 | 2/2012 | Hunt | |
| 2012/0037214 A1 | 2/2012 | Sagayama | |
| 2012/0056638 A1 | 3/2012 | Swahn | |
| 2012/0067738 A1 | 3/2012 | Field | |
| 2012/0090176 A1 | 4/2012 | Stancel et al. | |
| 2012/0131866 A1 | 5/2012 | Batut | |
| 2012/0132246 A1 | 5/2012 | Hunt et al. | |
| 2012/0132262 A1 | 5/2012 | Sagayama | |
| 2012/0152233 A1 | 6/2012 | Masuda et al. | |
| 2012/0198682 A1 | 8/2012 | Potter et al. | |
| 2012/0198779 A1 | 8/2012 | Tachino | |
| 2012/0199266 A1 | 8/2012 | Potter et al. | |
| 2012/0223033 A1 | 9/2012 | Molek | |
| 2012/0298201 A1 | 11/2012 | Stephan | |
| 2013/0068275 A1 | 3/2013 | Swahn et al. | |
| 2013/0133172 A1 | 5/2013 | Kiener et al. | |
| 2013/0139869 A1* | 6/2013 | Nuernberger | H02S 20/00 136/251 |
| 2013/0180568 A1 | 7/2013 | Hartelius | |
| 2013/0206206 A1 | 8/2013 | Bjorneklett et al. | |
| 2013/0248478 A1 | 9/2013 | Wheeler et al. | |
| 2013/0263914 A1 | 10/2013 | Crimmins et al. | |
| 2013/0319962 A1 | 12/2013 | Park et al. | |
| 2013/0340807 A1 | 12/2013 | Gerwing et al. | |
| 2014/0033511 A1 | 2/2014 | Swahn et al. | |
| 2014/0069483 A1 | 3/2014 | Wolter et al. | |
| 2015/0069001 A1 | 3/2015 | French et al. | |
| 2015/0144156 A1 | 5/2015 | French et al. | |
| 2015/0200619 A1 | 7/2015 | Worden | |
| 2015/0316639 A1 | 11/2015 | Russ et al. | |
| 2015/0330040 A1 | 11/2015 | Dobbs | |
| 2016/0044843 A1 | 2/2016 | Swahn et al. | |

FOREIGN PATENT DOCUMENTS

| | | |
|---|---|---|
| CN | 203055930 | 7/2013 |
| DE | 102009049926 | 4/2011 |
| EA | 200970984 | 6/2010 |
| EP | 2505934 | 10/2012 |
| FR | 2959555 | 11/2011 |
| JP | 54-23137 | 8/1979 |
| JP | 2-17200 | 2/1990 |
| JP | 07-018796 | 1/1995 |
| JP | 08-078715 | 3/1996 |
| JP | 2004-140256 | 5/2004 |
| JP | 3160565 U | 7/2010 |
| WO | WO 2006/117551 | 9/2006 |
| WO | WO 2010/054274 | 5/2010 |
| WO | WO 2010/136468 | 12/2010 |
| WO | WO 2010/145844 | 12/2010 |
| WO | WO 2012/003585 | 1/2012 |
| WO | WO 2012/107671 | 8/2012 |

OTHER PUBLICATIONS

United States Patent and Trademark Office, Non final office action dated Sep. 24, 2014 for U.S. Appl. No. 13/421,740 (15 pages).
United States Patent and Trademark Office, Non final office action dated Nov. 19, 2014 for U.S. Appl. No. 13/091,960 (26 pages).
Chinese Patent Office, First Office Action for CN 201280023942.0, mailed Mar. 20, 2015.
European Patent Office, Extended European Search Report for EP 12760313.2-1605 mailed Mar. 25, 2015 (6 pages).
United States Patent and Trademark Office, Non final office action dated May 7, 2015 for U.S. Appl. No. 13/195,562 (17 pages).
United States Patent and Trademark Office, Non final office action dated Mar. 25, 2015 for U.S. Appl. No. 13/794,217 (16 pages).
Chinese Patent Office, First Office Action for CN 201380035248.5, mailed Oct. 20, 2015.
United States Patent and Trademark Office, Final office action dated Aug. 26, 2015 for U.S. Appl. No. 13/091,960 (24 pages).
United States Patent and Trademark Office, Notice of Allowance dated Nov. 3, 2015 for U.S. Appl. No. 13/794,217 (5 pages).
Chinese Patent Office, First Office Action for CN 201380035428.5, mailed Oct. 20, 2015, with English Translation.
Chinese Patent Office, Second Office Action for CN 201280023942.0, mailed Feb. 14, 2016, with English translation.
United States Patent and Trademark Office, Non-Final office action dated Jan. 12, 2016 for U.S. Appl. No. 13/091,960 (22 pages).
United States Patent and Trademark Office, Notice of allowance dated Nov. 23, 2015 for U.S. Appl. No. 13/195,562 (17 pages).
United States Patent and Trademark Office, Notice of allowance dated Mar. 1, 2016 for U.S. Appl. No. 13/195,562 (15 pages).
United States Patent and Trademark Office, Final office action dated Nov. 20, 2015 for U.S. Appl. No. 13/421,740 (16 pages).
United States Patent and Trademark Office, Non final office action dated Mar. 2, 2016 for U.S. Appl. No. 13/421,740 (17 pages).
United States Patent and Trademark Office, Non final office action dated Dec. 7, 2015 for U.S. Appl. 14/481,678 (7 pages).
United States Patent and Trademark Office, Non final office action dated Dec. 31, 2015 for U.S. Appl. No. 14/050,237 (7 pages).
United States Patent and Trademark Office, Notice of Allowance dated Mar. 28, 2016 for U.S. Appl. No. 13/794,217 (6 pages).
Patent Cooperation Treaty, International Search Report for PCT/US14/54916 mailed Dec. 24, 2014 (2 pages).
Patent Cooperation Treaty, International Search Report for PCT/US14/53787 mailed Jan. 12, 2015 (2 pages).
Patent Cooperation Treaty, Written Opinion of the International Searching Authority for PCT/US14/54916 mailed Dec. 24, 2014 (9 pages).
Patent Cooperation Treaty, Written Opinion of the International Searching Authority for PCT/US14/53787 mailed Jan. 12, 2015 (7 pages).
Patent Cooperation Treaty, International Search Report for PCT/US11/027700 mailed May 3, 2011 (2 pages).
Patent Cooperation Treaty, Written Opinion of the International Searching Authority for PCT/US11/027700 mailed May 3, 2011 (4 pages).
Patent Cooperation Treaty, International Search Report for PCT/US11/033722 mailed Jul. 28, 2011 (2 pages).
Patent Cooperation Treaty, Written Opinion of the International Searching Authority for PCT/US11/033722 mailed Jul. 28, 2011 (9 pages).
Patent Cooperation Treaty, International Search Report for PCT/US11/038094 mailed Sep. 2, 2011 (2 pages).
Patent Cooperation Treaty, Written Opinion of the International Searching Authority for PCT/US11/038094 mailed Sep. 2, 2011 (12 pages).
Patent Cooperation Treaty, International Search Report for PCT/US11/046175 mailed Dec. 9, 2011 (2 pages).
Patent Cooperation Treaty, Written Opinion of the International Searching Authority for PCT/US11/046175 mailed Dec. 9, 2011 (8 pages).
Patent Cooperation Treaty, International Search Report for PCT/US12/029345 mailed Oct. 10, 2012 (4 pages).
Patent Cooperation Treaty, Written Opinion of the International Searching Authority for PCT/US12/029345 mailed Oct. 10, 2012 (8 pages).
Patent Cooperation Treaty, International Search Report for PCT/US13/30416 mailed Jun. 17, 2013 (2 pages).
Patent Cooperation Treaty, Written Opinion of the International Searching Authority for PCT/US13/30416 mailed Jun. 17, 2013 (6 pages).

(56) References Cited

OTHER PUBLICATIONS

Patent Cooperation Treaty, International Search Report for PCT/US13/40500 mailed Sep. 4, 2013 (2 pages).
Patent Cooperation Treaty, Written Opinion of the International Searching Authority for PCT/US13/40500 mailed Sep. 4, 2013 (9 pages).
United States Patent and Trademark Office, Non final office action dated Nov. 8, 2012 for U.S. Appl. No. 13/043,286 (14 pages).
United States Patent and Trademark Office, Non final office action dated Jan. 10, 2014 for U.S. Appl. No. 13/091,960 (21 pages).
United States Patent and Trademark Office, Non final office action dated Sep. 6, 2013 for U.S. Appl. No. 13/195,562 (15 pages).
United States Patent and Trademark Office, Non final office action dated Mar. 24, 2014 for U.S. Appl. No. 13/195,562 (24 pages).
United States Patent and Trademark Office, Non final office action dated Aug. 8, 2013 for U.S. Appl. No. 13/421,740 (9 pages).
United States Patent and Trademark Office, Final office action dated Mar. 24, 2014 for U.S. Appl. No. 13/421,740 (12 pages).
Australian Patent Office, Patent Examination Report No. 1 for Application 2013263123, mailed Jun. 30, 2016 (4 pages).
Kazakhstan Patent Office, Official Action for Application 2014/2546.1, date stamped Jul. 22, 2016.
Patent Office of the Cooperation Counsel of the Arab States of the Gulf, Examination Report for GC 2012-22216, mailed Mar. 7, 2016 (5 pages).
Patent Cooperation Treaty, International Search Report for PCT/US2016/032459 mailed Sep. 8, 2016 (4 pages).
Patent Cooperation Treaty, Written Opinion of the International Searching Authority for PCT/US2016/032459 mailed Sep. 8, 2016 (7 pages).
Patent Cooperation Treaty, International Search Report for PCT/US2016/032464 mailed Oct. 4, 2016 (4 pages).
Patent Cooperation Treaty, Written Opinion of the International Searching Authority for PCT/US2016/032464 mailed Oct. 4, 2016 (7 pages).
United States Patent and Trademark Office, Notice of Allowance dated Sep. 29, 2016 for U.S. Appl. No. 13/421,740 (8 pages).
United States Patent and Trademark Office, Office Action dated Jun. 28, 2016 for U.S. Appl. No. 14/050,237 (13 pages).
United States Patent and Trademark Office, Notice of Allowance dated Jun. 14, 2016 for U.S. Appl. No. 13/091,960 (9 pages).
United States Patent and Trademark Office, Notice of Allowance dated Jun. 7, 2016 for U.S. Appl. No. 14/481,678 (5 pages).
Array Technologies, Inc., Technical Datasheet for DuraTrack® HZ v3 (2 pages).
Exosun Inc., Technical Datasheet for exotrack® HZ v.2 (4 pages).
Ideematec Deutschland GmbH, Product literature for safeTrack Horizon (6 pages).
Lovejoy, Inc., "Lovejoy Coupling Solutions" catalog of discs (28 pages).
Lovejoy, Inc., Technical Datasheet for Lovejoy 4 Bolt Disc Coupling (2 pages).
NEXTracker, Inc., Product literature for Self-Powered Tracking with NEXTrackerSPT (3 pages).
Optimum Tracker, Technical Datasheet for O-Track HZ (4 pages).
R+W America, Technical Datasheet for Ecolight® Elastomer Couplings (4 pages).
YouTube, "Soluzioni per lavaggio e pulizia fotovoltaico / Solar panel cleaning solutions / Lavaggio pannelli," 3:22 minute video uploaded to YouTube by Wash Panel, published on May 3, 2013, https://www.youtube.com/watch?v=b6duSZH1C9o , 7 pages (screen shots obtained on Aug. 11, 2016).
Japanese Patent Office, First Office Action for JP 2015-512704 mailed Jan. 31, 2017, with English Translation.

* cited by examiner

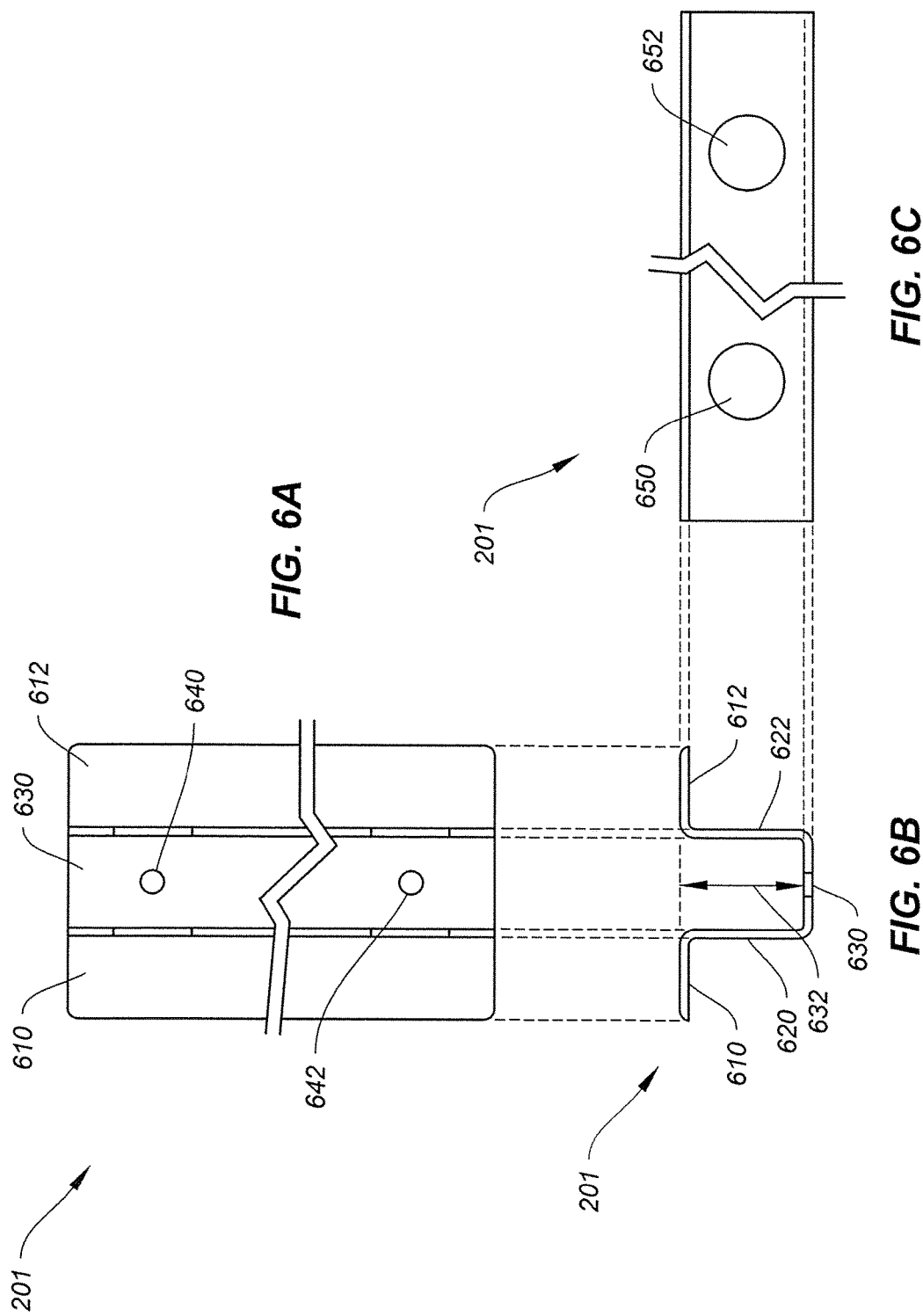

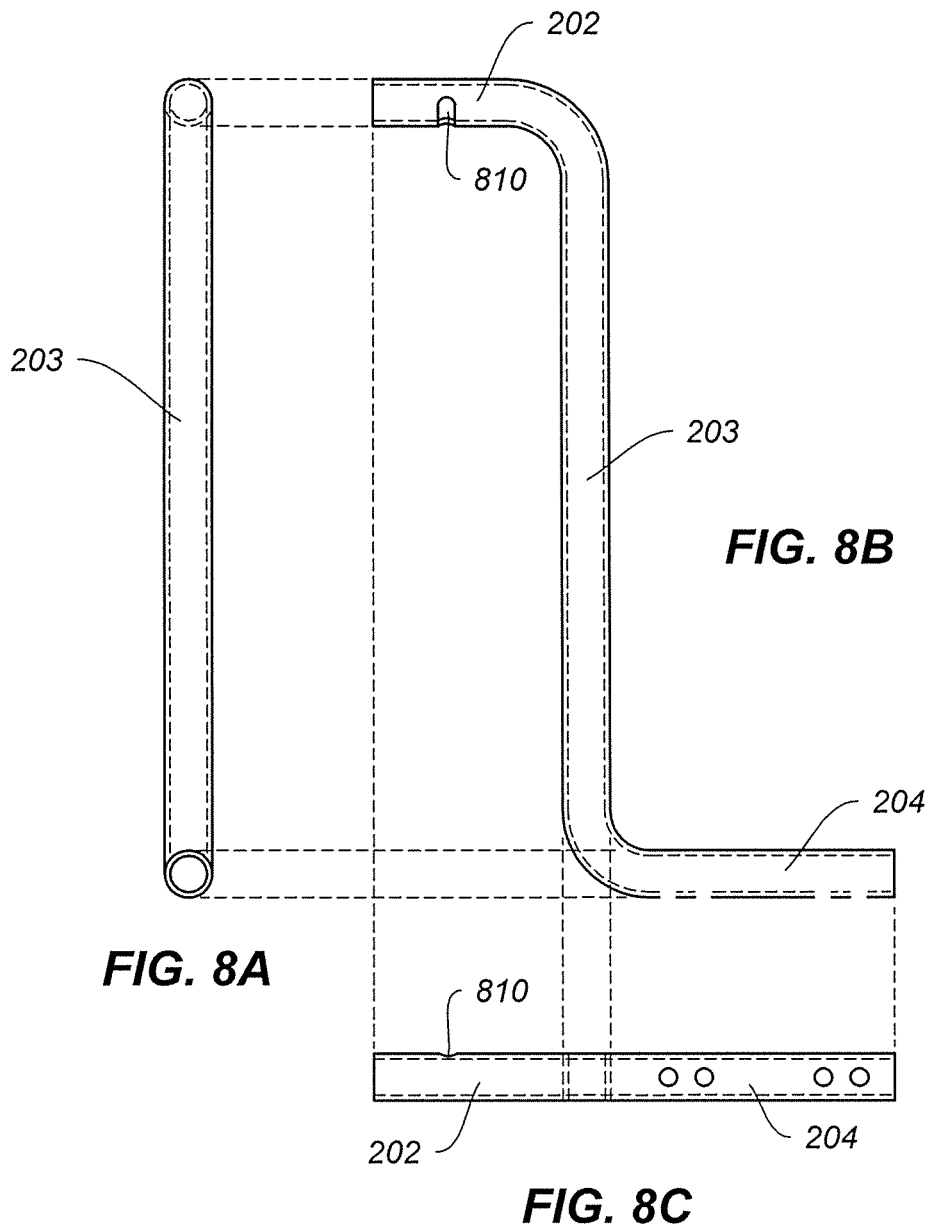

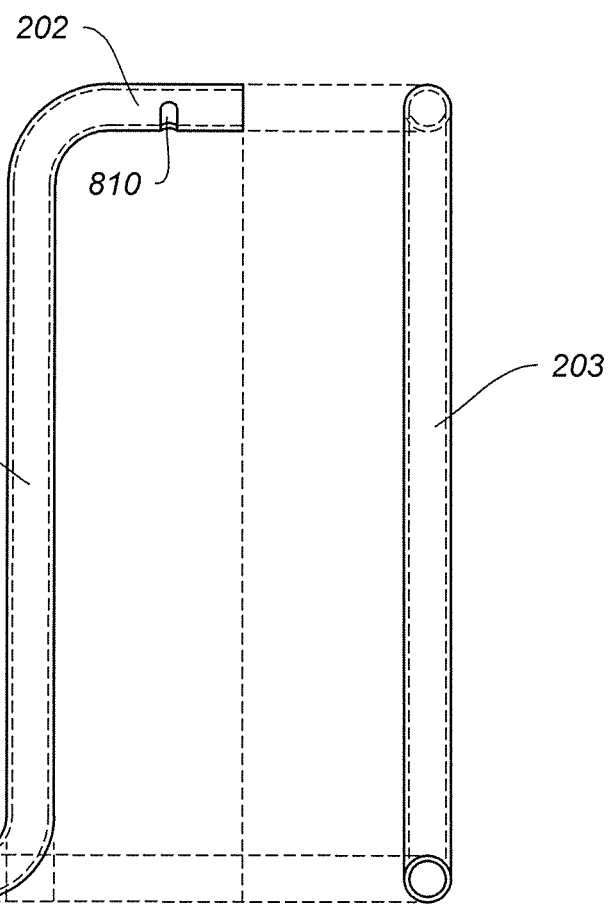
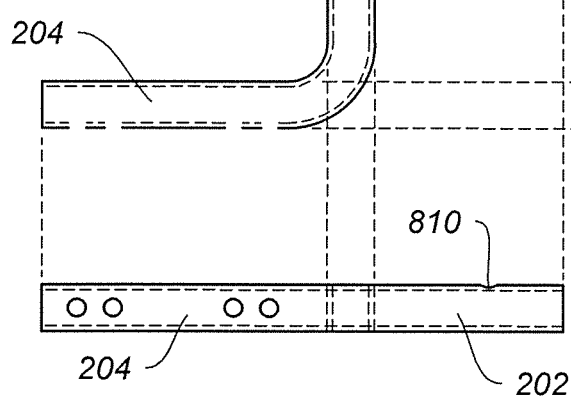
FIG. 9B
FIG. 9A
FIG. 9C

ROTATABLE SUPPORT SYSTEM FOR MOUNTING ONE OR MORE PHOTOVOLTAIC MODULES

1. CROSS-REFERENCES TO RELATED APPLICATIONS

This application claims priority to U.S. Provisional Application No. 61/647,991, filed May 16, 2012, commonly assigned, incorporated by reference herein for all purposes.

Additionally, this application is related to U.S. patent application Ser. No. 13/091,960, commonly assigned, incorporated by reference herein for all purposes.

2. BACKGROUND OF THE INVENTION

The present invention is directed to photovoltaic systems. More particularly, the invention provides systems and methods for mounting photovoltaic modules. Merely by way of example, the invention has been applied to supporting photovoltaic modules with a predetermined tilt. But it would be recognized that the invention has a much broader range of applicability.

Photovoltaics convert sunlight into electricity, providing a desirable source of clean energy. FIG. 1 is a simplified diagram of a conventional photovoltaic array. The photovoltaic array 100 includes strings 1, 2, 3, 4, . . . n, where n is a positive integer larger than or equal to 1. Each string includes photovoltaic (PV) modules (e.g., solar panels) that are connected in series. The photovoltaic array 100 is connected to a central inverter 110, which provides an alternating current (AC) connection to a power grid 120.

The installation of photovoltaic arrays often presents logistical challenges. For example, some conventional mounting systems hold photovoltaic modules (e.g., solar panels) at a fixed tilt toward the equator with a tilt angle from the horizon that is approximately equal to the latitude of the photovoltaic arrays. Often, these mounting systems are assembled by hand in the field from metal components; therefore, assembling these mounting systems usually are expensive and labor intensive. The mounting systems often need to withstand harsh outdoor conditions and mechanical loads for a significant period of time, such as 20 years or more.

Hence, it is highly desirable to improve techniques for the mounting of PV modules.

3. BRIEF SUMMARY OF THE INVENTION

The present invention is directed to photovoltaic systems. More particularly, the invention provides systems and methods for mounting photovoltaic modules. Merely by way of example, the invention has been applied to supporting photovoltaic modules with a predetermined tilt. But it would be recognized that the invention has a much broader range of applicability.

According to one embodiment, a rotatable support system for mounting one or more photovoltaic modules includes a stiffener configured to be attached to the one or more photovoltaic modules, a column connected to the stiffener through at least a rotatable component, and a foot connected to the column. The column is configured to rotate from a folded position towards an unfolded position, and stop at the unfolded position separated from the folded position by an angle difference. The angle difference represents the maximum range of rotation for the column.

According to another embodiment, a rotatable support system for mounting one or more photovoltaic modules includes a first stiffener configured to be attached to a photovoltaic module, a first column connected to the first stiffener through at least a first rotatable component, a first foot connected to the first column, a second column connected to the first stiffener through at least a second rotatable component, a second foot connected to the second column, a second stiffener configured to be attached to the photovoltaic module, a third column connected to the second stiffener through at least a third rotatable component, a third foot connected to the third column, a fourth column connected to the second stiffener through at least a fourth rotatable component, and a fourth foot connected to the fourth column. The first column is configured to rotate from a first folded position towards a first unfolded position, and stop at the first unfolded position separated from the first folded position by a first angle difference. The first angle difference represents the first maximum range of rotation for the first column. Additionally, the second column is configured to rotate from a second folded position towards the second unfolded position, and stop at the second unfolded position separated from the second folded position by a second angle difference. The second angle difference represents the second maximum range of rotation for the second column. Moreover, the third column is configured to rotate from a third folded position towards a third unfolded position, and stop at the third unfolded position separated from the third folded position by a third angle difference. The third angle difference represents the third maximum range of rotation for the third column. Also, the fourth column is configured to rotate from a fourth folded position towards a fourth unfolded position, and stop at the fourth unfolded position separated from the fourth folded position by a fourth angle difference. The fourth angle difference represents the fourth maximum range of rotation for the fourth column. The first column and the second column are different in length, the third column and the fourth column are different in length, the first column and the third column are the same in length, and the second column and the fourth column are the same in length. The first angle difference and the third angle difference are the same in magnitude, and the second angle difference and the fourth angle difference are the same in magnitude.

According to yet another embodiment, a method for mounting one or more photovoltaic modules includes attaching a photovoltaic module to a stiffener. The stiffener is a part of a rotatable support system further including a column and a foot connected to the column. Additionally, the method includes attaching the column to the stiffener through at least a rotatable component, placing the column in a folded position, moving the photovoltaic module with the rotatable support system to an installation location, rotating the column from the folded position towards an unfolded position, and stopping the column at the unfolded position separated from the folded position by an angle difference. The angle difference represents the maximum range of rotation for the column.

Depending upon the embodiment, one or more benefits may be achieved. These benefits and various additional objects, features, and advantages of the present invention can be fully appreciated with reference to the detailed description and accompanying drawings that follow.

4. BRIEF DESCRIPTION OF THE DRAWINGS

FIG. 6A is a simplified diagram showing a top view of the stiffener, FIG. 6B is a simplified diagram showing a cross-section view of the stiffener, and FIG. 6C is a simplified diagram showing a side view of the stiffener as part of the rotatable support system for mounting one or more photovoltaic modules according to certain embodiments of the present invention.

FIGS. 8A-8C are simplified diagrams showing side views of the spacer as part of the rotatable support system for mounting one or more photovoltaic modules according to certain embodiments of the present invention, and FIGS. 9A-9C are simplified diagrams showing side views of the spacer as part of the rotatable support system for mounting one or more photovoltaic modules according to some embodiments of the present invention.

Figure 10:
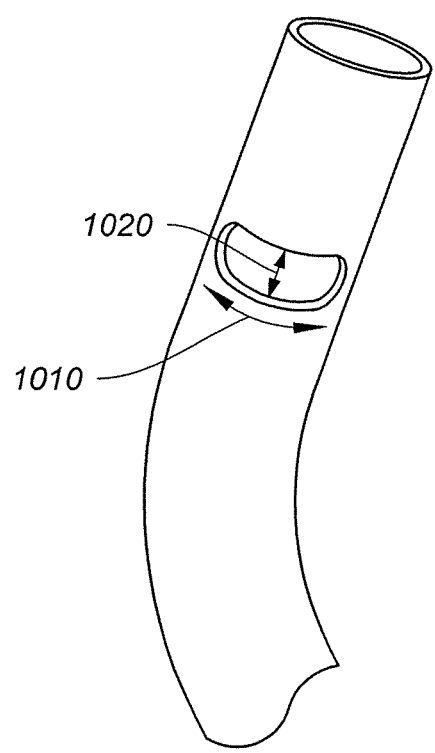

FIG. 10 is a simplified diagram showing the groove of the rotatable component as part of the rotatable support system for mounting one or more photovoltaic modules according to one embodiment of the present invention.

Figure 11:
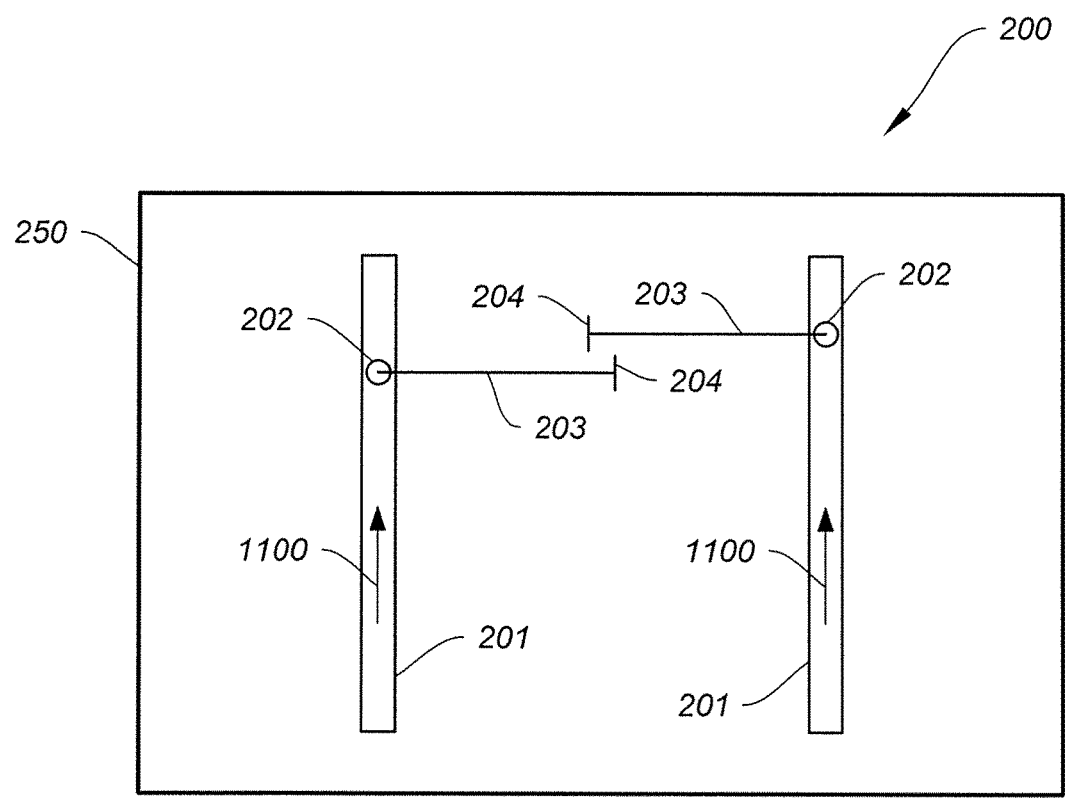

FIG. 11 is a simplified diagram showing the rotatable support system for mounting one or more photovoltaic modules in a folded position according to yet another embodiment of the present invention.

Figure 12A:
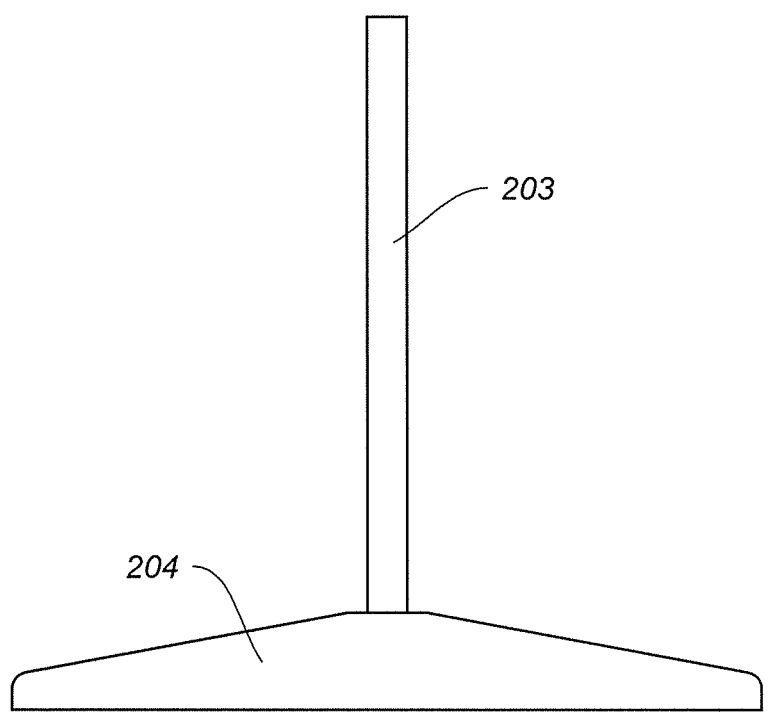
Figure 12B:
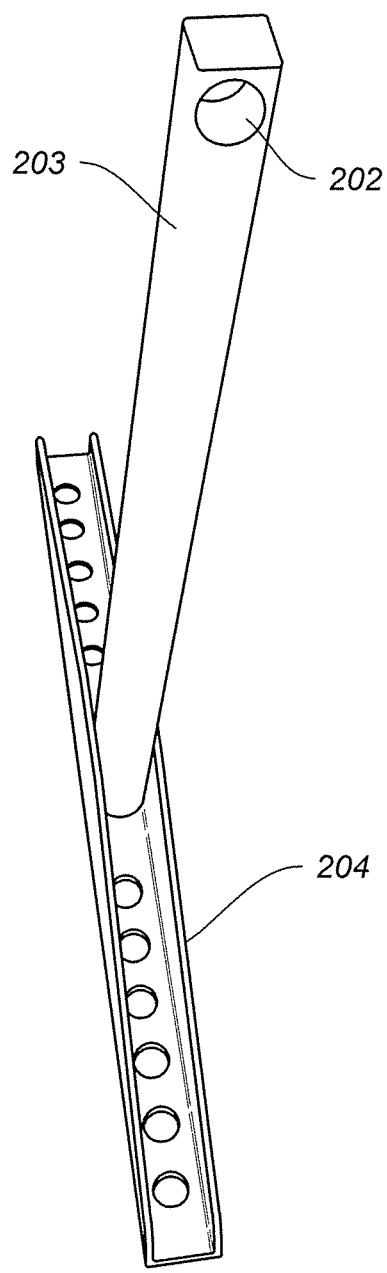

FIGS. 12A-12B are simplified diagrams showing the spacer as part of the rotatable support system for mounting one or more photovoltaic modules according to certain embodiments of the present invention.

Figure 13:
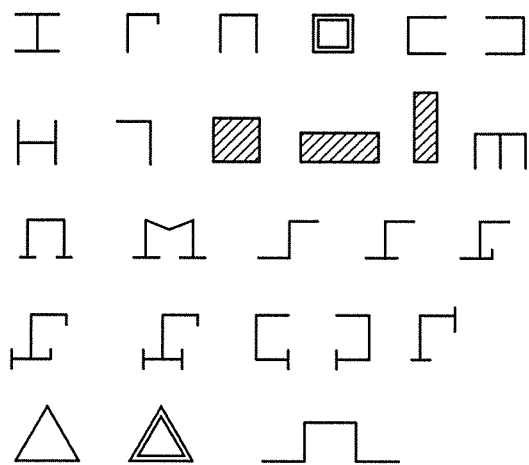

FIG. 13 shows simplified diagrams for various shapes of the stiffener as part of the rotatable support system for mounting one or more photovoltaic modules according to certain embodiments of the present invention.

Figure 14:
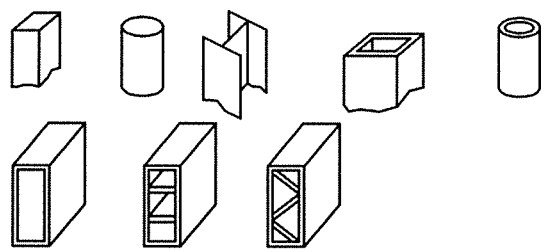

FIG. 14 shows simplified diagrams for various shapes of the column as part of the rotatable support system for mounting one or more photovoltaic modules according to some embodiments of the present invention.

Figure 15:
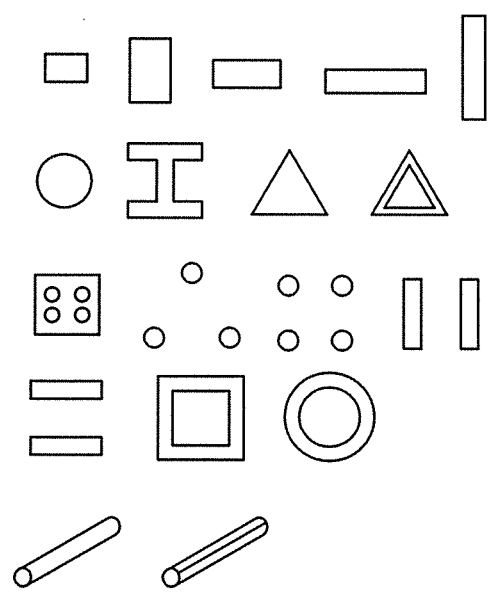

FIG. 15 shows simplified diagrams for various shapes of the foot as part of the rotatable support system for mounting one or more photovoltaic modules according to certain embodiments of the present invention.

Figure 16:
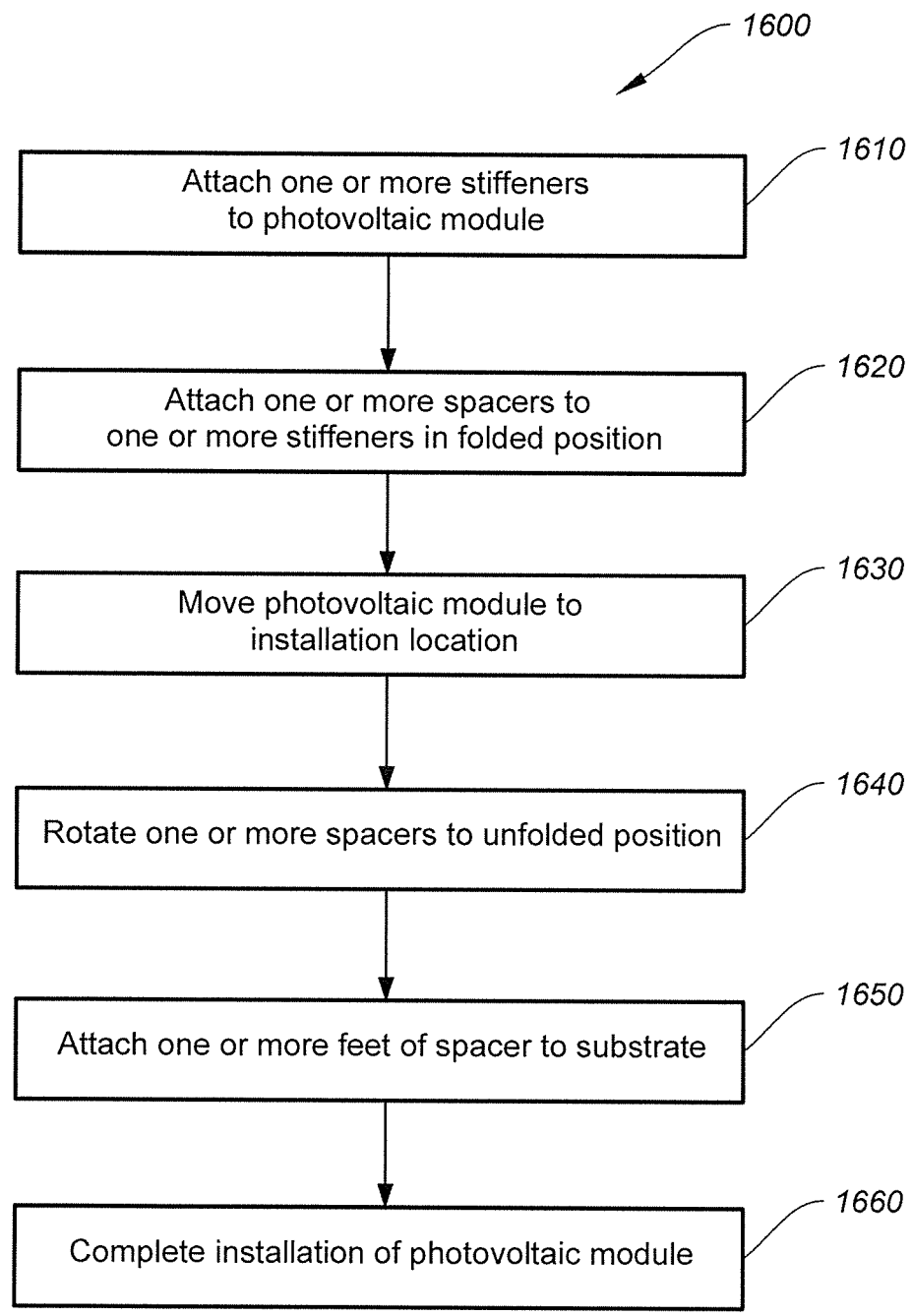

FIG. 16 is a simplified diagram showing a method for installing the photovoltaic module using the rotatable support system according to an embodiment of the present invention.

FIGS. 17A-17E are simplified diagrams showing the process of rotating one or more spacers from folded position to unfolded position and the process of attaching one or more feet of each of one or more spacers to substrate as parts of the method for installing the photovoltaic module using the rotatable support system according to certain embodiments of the present invention.

Figure 18:
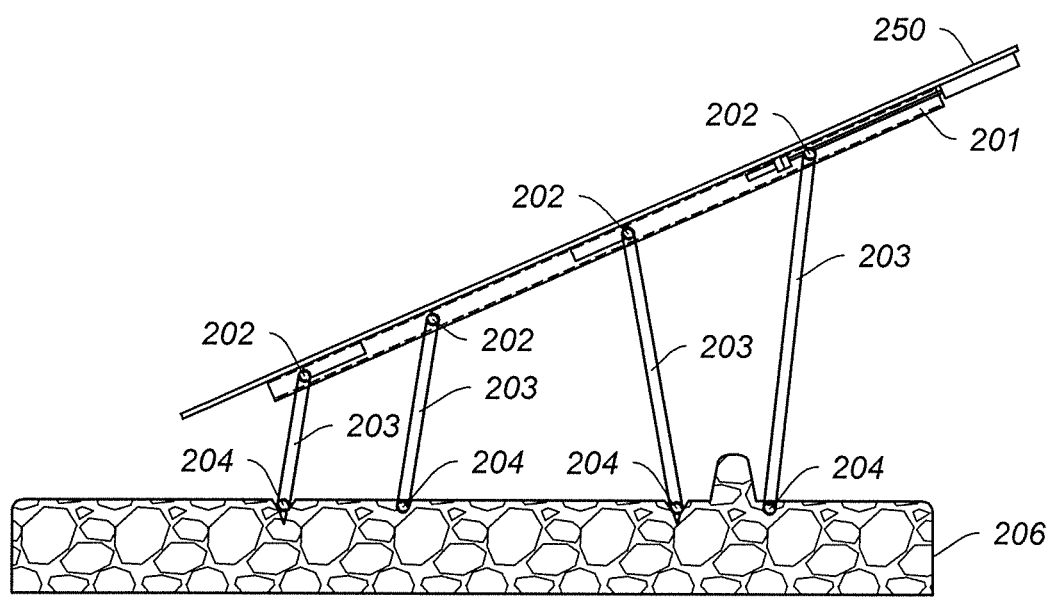

FIG. 18 is a simplified diagram showing the rotatable support system for mounting one or more photovoltaic modules in a unfolded and mounted position according to yet another embodiment of the present invention.

Figure 1:
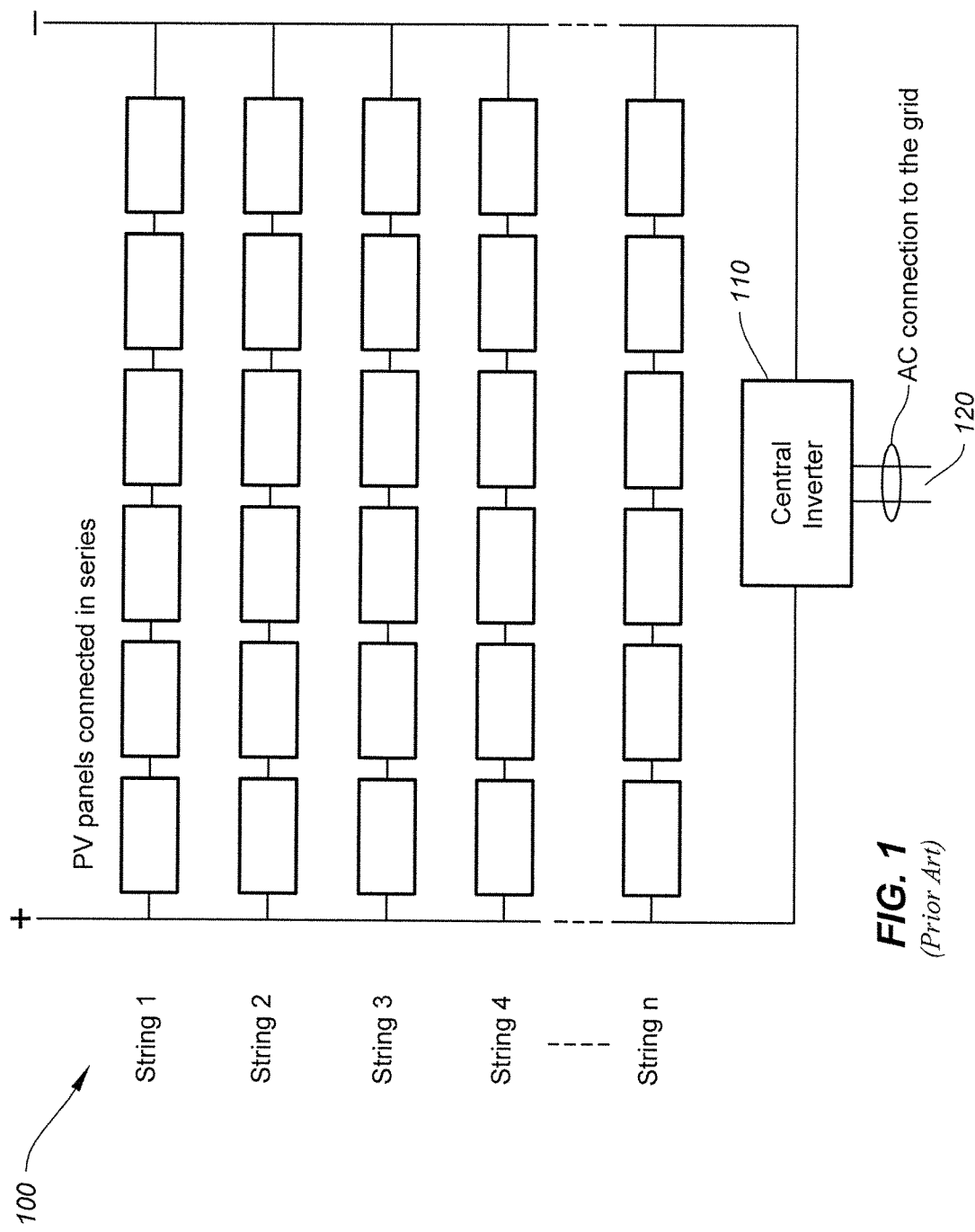
FIG. 1 is a simplified diagram of a conventional photovoltaic array.
Figure 2A:
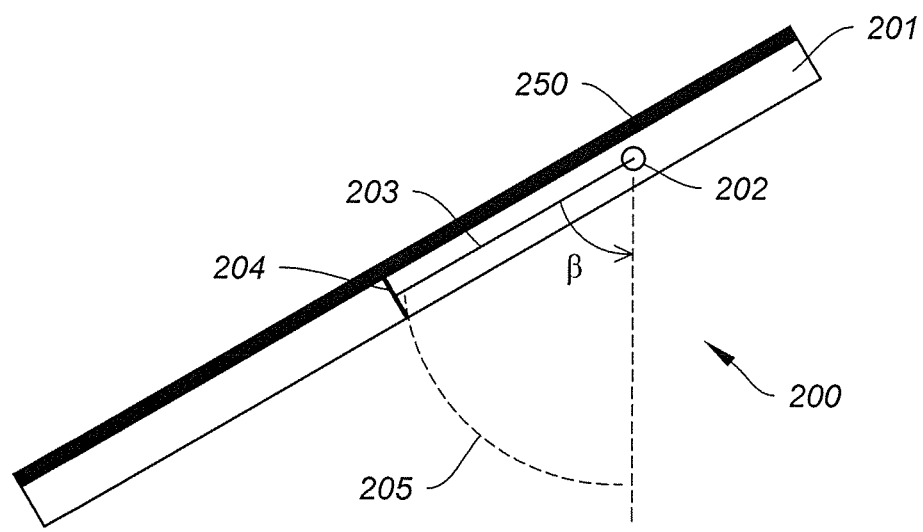
FIG. 2A is a simplified diagram showing a rotatable support system for mounting one or more photovoltaic modules in a folded position.
Figure 2B:
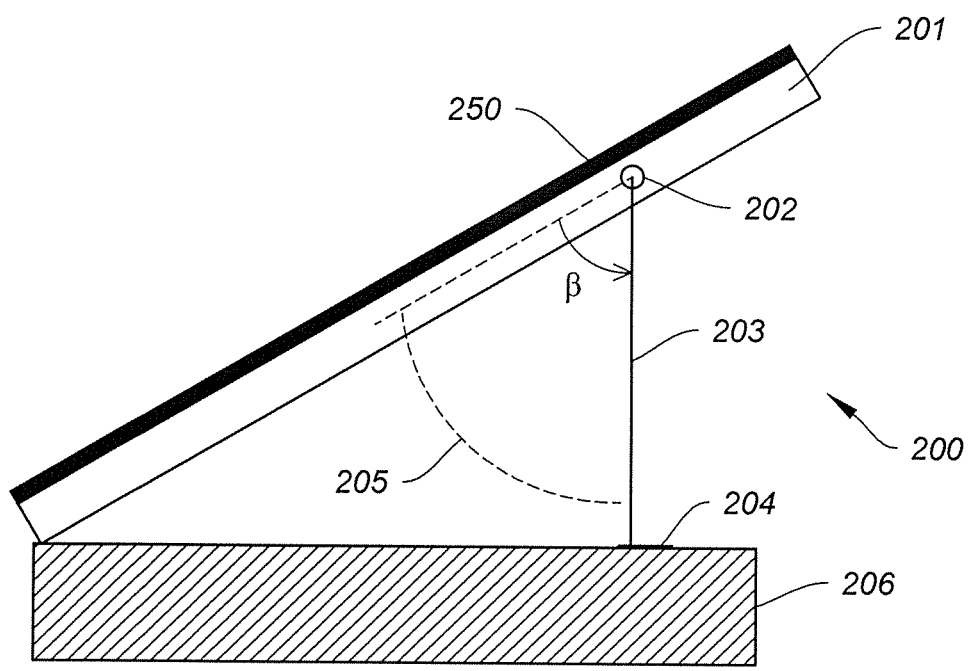
FIG. 2B is a simplified diagram showing the rotatable support system for mounting one or more photovoltaic modules in a unfolded and mounted position, according to some embodiments of the present invention.
Figure 19A:
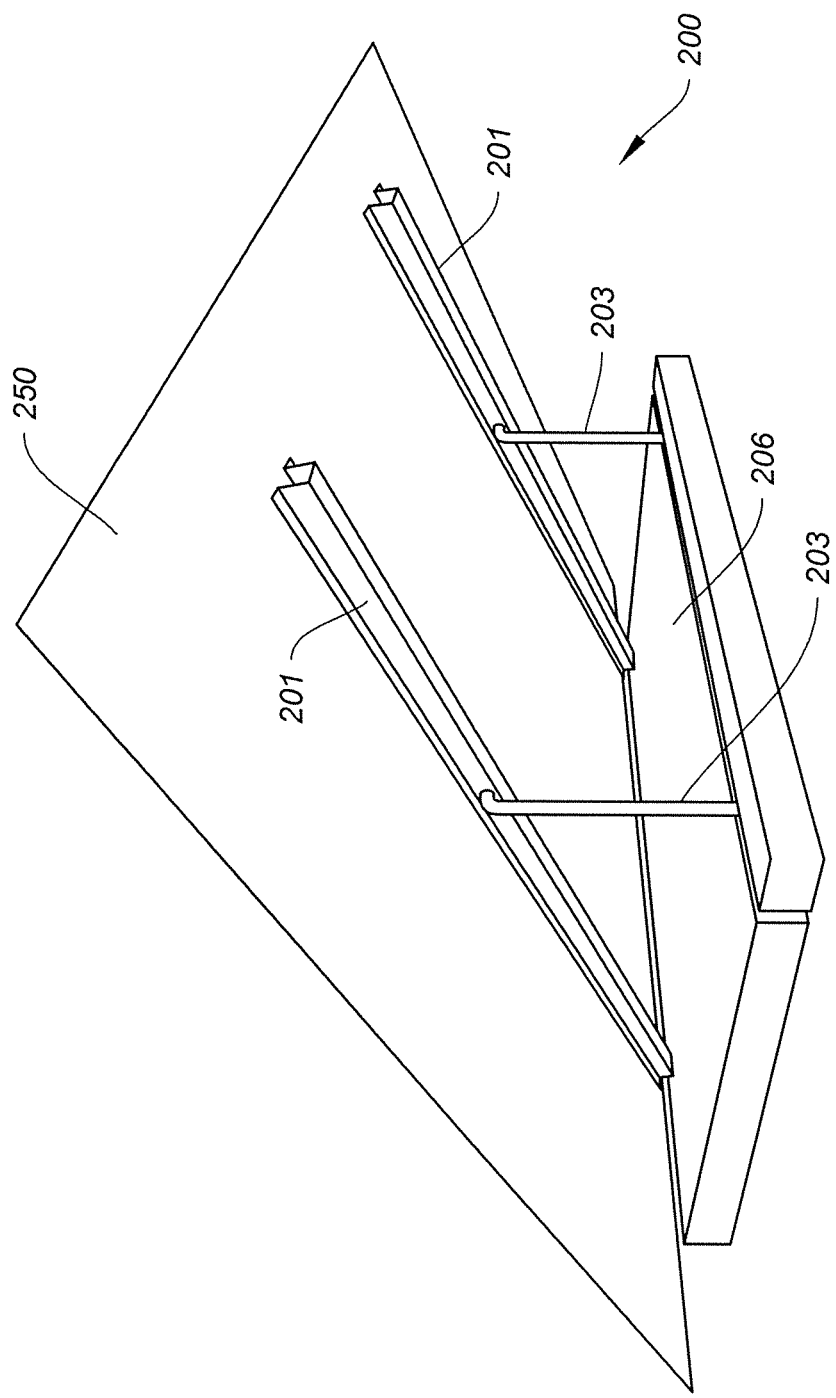
Figure 19B:
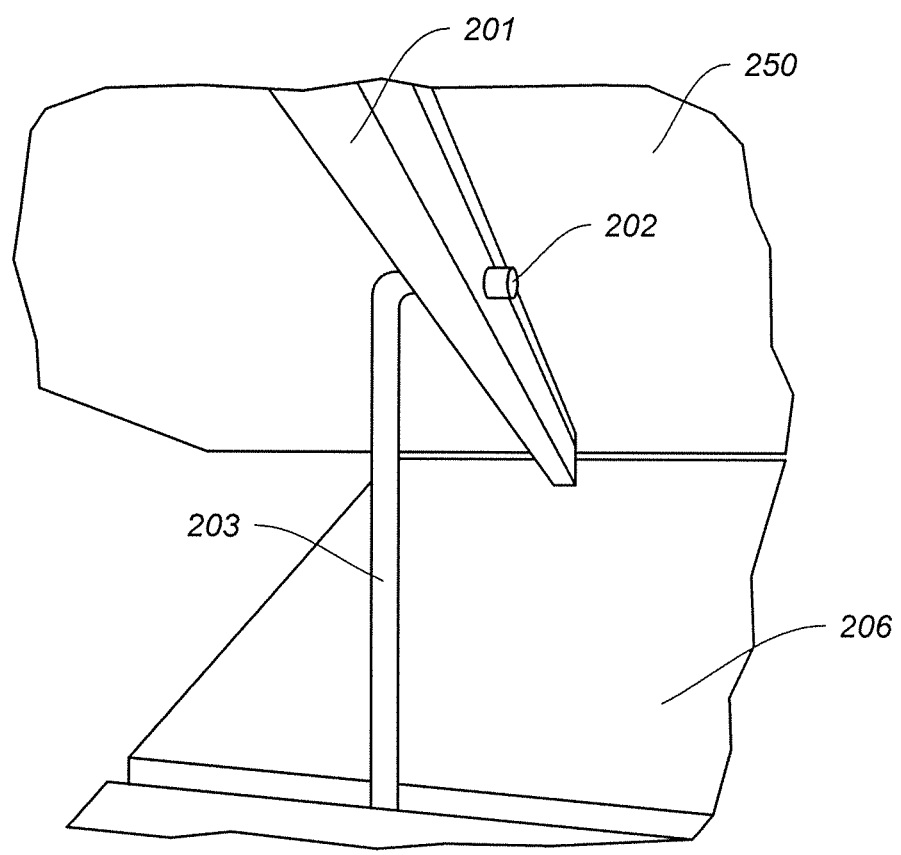

FIGS. 19A-19B are simplified diagrams showing the rotatable support system for mounting one or more photovoltaic modules in a unfolded and mounted position as shown in FIG. 2B according to certain embodiments of the present invention.

5. DETAILED DESCRIPTION OF THE INVENTION

The present invention is directed to photovoltaic systems. More particularly, the invention provides systems and methods for mounting photovoltaic modules. Merely by way of example, the invention has been applied to supporting photovoltaic modules with a predetermined tilt. But it would be recognized that the invention has a much broader range of applicability.

FIG. 2A is a simplified diagram showing a rotatable support system for mounting one or more photovoltaic modules in a folded position, and FIG. 2B is a simplified diagram showing the rotatable support system for mounting one or more photovoltaic modules in a unfolded and mounted position, according to some embodiments of the present invention. These diagrams are merely examples, which should not unduly limit the scope of the claims. One of ordinary skill in the art would recognize many variations, alternatives, and modifications.

As shown in FIG. 2A, the rotatable support system 200 includes one or more stiffeners 201 and one or more spacers. In one embodiment, the rotatable support system 200 is configured to support a photovoltaic module 250 (e.g., a solar panel). In another embodiment, each of the one or more spacers includes a rotatable component 202, a column 203, and a foot 204. For example, the column 203 and the foot 204 of the same spacer form a T shape. In another example, each of the stiffeners 201 includes a module frame attached to the photovoltaic module 250 (e.g., a solar panel), and/or one or more beams that are attached to the photovoltaic module 250 (e.g., being bonded to the back of the solar panel 250).

According to one embodiment, each of the stiffeners 201 is made of aluminum, polymer, and/or roll-formed steel. For example, each of the stiffeners 201 is coated with one or more protective coatings (e.g., a protective coating that is durable outdoors for 20 years or more). In another example, each of the stiffeners 201 is coated for electrical safety with one or more non-conductive materials (e.g., PVC and/or EPDM).

According to another embodiment, each of the one or more stiffeners 201 includes one or more holes and/or one or more brackets. For example, the one or more holes and/or the one or more brackets form at least a portion of the rotatable component 202. In another example, the rotatable component 202 includes a bushing and/or a bearing to improve ease of rotation and/or increase the mechanical load that the rotatable component 202 can support. In yet another example, the rotatable component 202 provides sufficient rotational friction to stay immobile during shipping of the photovoltaic module 250 that is attached to the rotatable support system 200.

In one embodiment, the column 203 is attached to the rotatable component 202. For example, the rotatable component 202 can rotate freely with the weight of the column 203 due to gravity. In another example, the rotatable component 202 has sufficient friction to necessitate physical force to rotate the column 203. In yet another example, the column 203 is held in place during shipping with friction between the column 203 and the corresponding stiffener 201. In another embodiment, the foot 204 is sufficiently strong to allow mounting of the photovoltaic module 250 (e.g., a solar panel) onto a substrate 206 with sufficient strength to endure mechanical loads. For example, the foot 204 follows a rotation path 205 of the column 203 when the column 203 is unfolded. In another example, the rotation path 205 corresponds to an angle difference β, which represents the maximum range of rotation for the column 203. In another example, each of the one or more stiffeners 201 includes one or more cutouts to allow for physical presence of the foot 204.

As shown in FIG. 2B, the column 203 and the foot 204 have been rotated about the corresponding axis of the rotatable component 202, and the feet 204 is attached to the substrate 206. For example, the foot 204 is attached to the substrate 206 with one or more adhesive materials, such as a construction adhesive material (e.g., a two-part anchoring epoxy). In another example, the foot 204 is attached to the substrate 106 by one or more construction mechanisms, such as one or more bolts, one or more screws, and/or one or more other anchors. In yet another example, the foot 204 is attached to the substrate 106 by pushing the foot 204 into the pliable concrete of the substrate 206 before the pliable concrete hardens.

According to one embodiment, the column 203 interacts with one or more mechanical stops on the corresponding stiffener 201 to maintain a desired angle between the column 203 and the stiffener 201. For example, the one or more mechanical stops on the stiffener 201 include one or more screws, one or more cotter pins, one or more rivets, and/or one or more bent portions of the stiffener 201. In another example, the one or more stiffeners 201 are electrically bonded to each other. In yet another example, the column 203 is electrically bonded to another column and/or to the one or more stiffeners 201.

According to another embodiment, the column 203 is sufficiently strong to support certain mechanical forces including the weight of the photovoltaic module 250 (e.g., a solar panel), snow load on the photovoltaic module 250, positive wind load on the photovoltaic module 250, and/or negative wind load on the photovoltaic module 250. For example, the mechanical forces are up to 5400 pascal (Pa) downward and 2400 Pa upward in addition to gravitational load (e.g., the weight of the solar panel 250).

According to certain embodiments, the column 203 is sufficiently long to perform one or more of the following functions:
  (a) support the photovoltaic module 250 (e.g., a solar panel) at the desired tilt angle above the substrate 206;
  (b) allow airflow behind the photovoltaic module 250 (e.g., a solar panel) for cooling the photovoltaic module 250 during operation;
  (c) allow height above the substrate 206 for vegetation to grow without shading the photovoltaic module 250 (e.g., a solar panel); and/or
  (d) allow flood water to flow under the photovoltaic module 250 (e.g., a solar panel).

According to some embodiments, the column 203 is composed of polymer and/or metal. For example, the column 203 is coated with one or more protective coatings (e.g., a protective coating that is durable outdoors for 20 years or more). In another example, the column 203 is coated for electrical safety with one or more non-conductive materials (e.g., PVC and/or EPDM).

Figure 3:
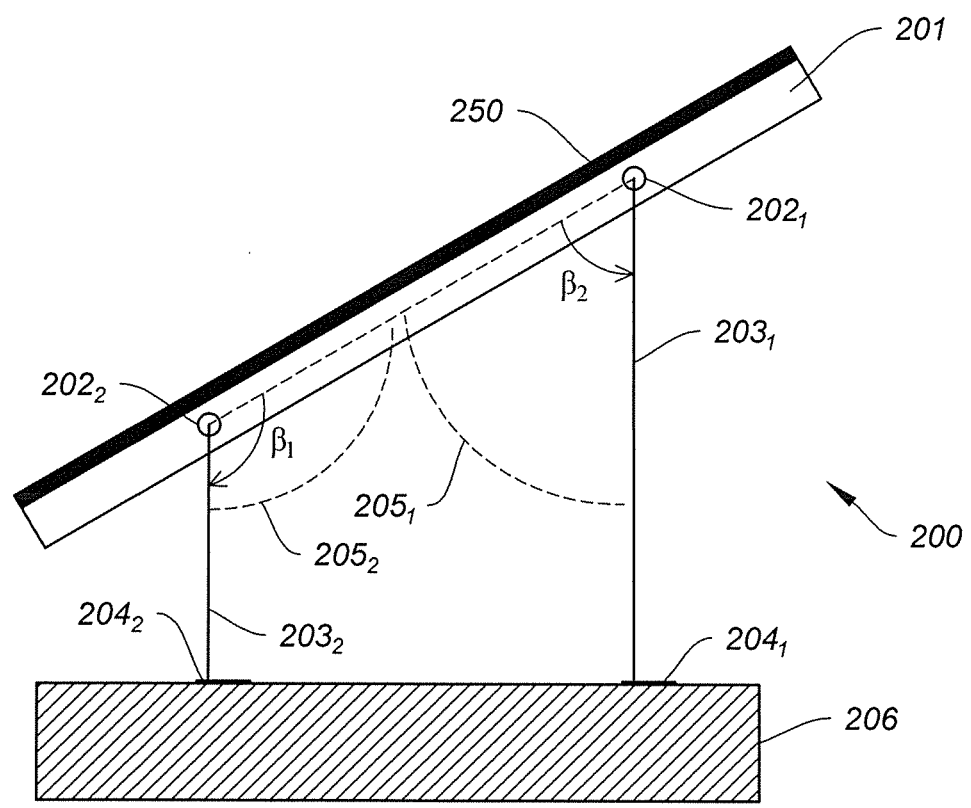
FIG. 3 is a simplified diagram showing the rotatable support system 200 for mounting one or more photovoltaic modules in a unfolded and mounted position according to another embodiment of the present invention.
Figure 4:
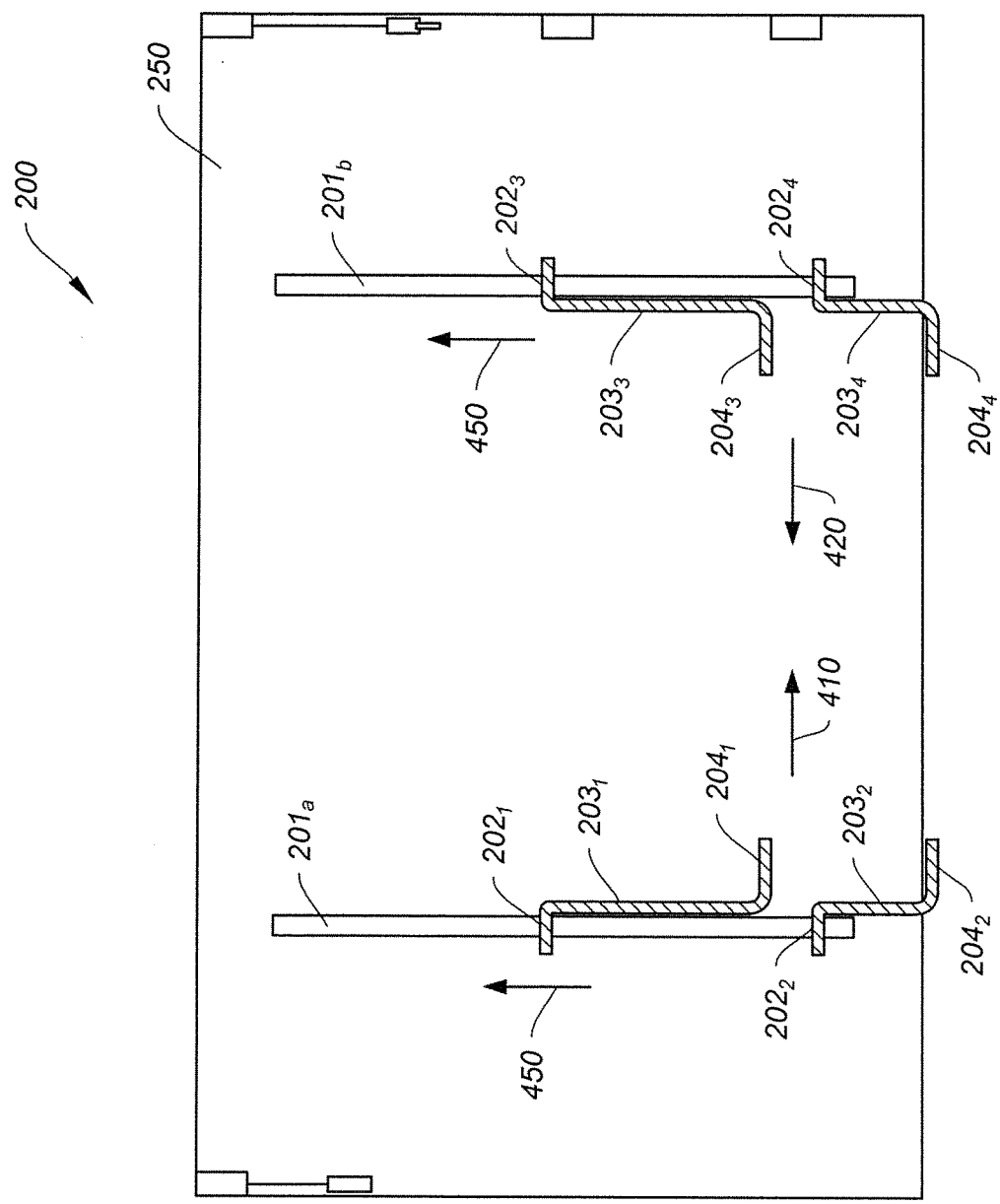
FIG. 4 is a simplified diagram showing a top view of the rotatable support system 200 for mounting one or more photovoltaic modules in a folded position according to yet another embodiment of the present invention.

As discussed above and further emphasized here, FIGS. 2A-2B are merely examples, which should not unduly limit the scope of the claims. One of ordinary skill in the art would recognize many variations, alternatives, and modifications. For example, the rotatable support system 200 includes at least two spacers as shown in FIG. 3. In another example, the rotatable support system 200 includes at least two stiffeners 201 and at least four spacers as shown in FIG. 4 and/or FIG. 5.

FIG. 3 is a simplified diagram showing the rotatable support system 200 for mounting one or more photovoltaic modules in a unfolded and mounted position according to another embodiment of the present invention. This diagram is merely an example, which should not unduly limit the scope of the claims. One of ordinary skill in the art would recognize many variations, alternatives, and modifications.

As shown in FIG. 3, the rotatable support system 200 includes one or more stiffeners 201 and at least two spacers. In one embodiment, the rotatable support system 200 is configured to support the photovoltaic module 250 (e.g., a solar panel). In another embodiment, each of the two spacers includes a rotatable component 202, a column 203, and a foot 204 according to one embodiment. For example, the column 203 and the foot 204 of the same spacer form a T shape. In another example, the columns 203 and the feet 204 have been rotated about the corresponding axes of the rotatable components 202 respectively. In yet another example, the feet 204 are attached to the substrate 206.

Also, as shown in FIG. 3, one of the two spacers includes the rotatable component $202_1$, the column $203_1$, and the foot $204_1$, and the other of the two spacers includes the rotatable component $202_2$, the column $203_2$, and the foot $204_2$. In one embodiment, the foot $204_1$ follows a rotation path $205_1$ of the column $203_1$ when the column $203_1$ is unfolded. For example, the rotation path $205_1$ corresponds to an angle difference $\beta_1$, which represents the maximum range of rotation for the column $203_1$. In another embodiment, the foot $204_2$ follows a rotation path $205_2$ of the column $203_2$ when the column $203_2$ is unfolded. For example, the rotation path $205_2$ corresponds to an angle difference $\beta_2$, which represents the maximum range of rotation for the column $203_2$. In another example, the angle difference $\beta_1$ and the angle difference $\beta_2$ are different in magnitude.

As discussed above and further emphasized here, FIG. 3 is merely an example, which should not unduly limit the scope of the claims. One of ordinary skill in the art would recognize many variations, alternatives, and modifications. For example, the angle difference $\beta_1$ and the angle difference $\beta_2$ are the same in magnitude.

FIG. 4 is a simplified diagram showing a top view of the rotatable support system 200 for mounting one or more photovoltaic modules in a folded position according to yet another embodiment of the present invention. This diagram is merely an example, which should not unduly limit the scope of the claims. One of ordinary skill in the art would recognize many variations, alternatives, and modifications.

As shown in FIG. 4, the rotatable support system 200 includes two stiffeners 201 and four spacers. For example, the rotatable support system 200 is configured to support the photovoltaic module 250 (e.g., a solar panel). In another example, each of the two stiffeners 201 is attached to two of the four spacers. In yet another example, each of the four spacers includes a rotatable component 202, a column 203, and a foot 204.

In one embodiment, the column 203 and the foot 204 of the same spacer are configured to rotate around (e.g., perpendicularly to) the axis of the rotatable component 202 that is attached to the corresponding stiffener 201. For example, the corresponding stiffener 201 extends in a direction 450, and the axis of the rotatable component 202 is perpendicular to the corresponding direction 450. In another embodiment, the column 203 and the foot 204 of the same spacer form an L shape. For example, the two feet 204 of the two spacers that are attached to the same stiffener 201 points to the same direction.

Also, as shown in FIG. 4, the two stiffeners 201 include the stiffener $201_a$ and the stiffener $201_b$. For example, the stiffener $201_a$ is attached to the two spacers, one of which includes the rotatable component $202_1$, the column $203_1$, and the foot $204_1$ and the other of which includes the rotatable component $202_2$, the column $203_2$, and the foot $204_2$. In another example, the stiffener $201_b$ is attached to the two spacers, one of which includes the rotatable component $202_3$, the column $203_3$, and the foot $204_3$ and the other of which includes the rotatable component $202_4$, the column $203_4$, and the foot $204_4$.

In one embodiment, the columns $203_1$, $203_2$, $203_3$, and $203_4$ correspond to a first maximum range of rotation, a second maximum range of rotation, a third maximum range of rotation, and a fourth maximum range of rotation, respectively. For example, the first maximum range of rotation and the third maximum range of rotation are the same in magnitude, and the second maximum range of rotation and the fourth maximum range of rotation are the same in magnitude. In another example, the first maximum range of rotation and the second maximum range of rotation are the same in magnitude, and the third maximum range of rotation and the fourth maximum range of rotation are the same in magnitude. In yet another example, the first maximum range of rotation and the second maximum range of rotation are different in magnitude, and the third maximum range of rotation and the fourth maximum range of rotation are different in magnitude.

In another embodiment, the columns $203_1$ and $203_2$ are different in length, the columns $203_3$ and $203_4$ are different in length, the columns $203_1$ and $203_3$ are the same in length, and the columns $203_2$ and $203_4$ are the same in length. In yet another embodiment, the column $203_1$ and the foot $204_1$ are configured to form a first L shape, the column $203_2$ and the foot $204_2$ are configured to form a second L shape, the column $203_3$ and the foot $204_3$ are configured to form a third L shape, and the column $203_4$ and the foot $204_4$ are configured to form a fourth L shape. For example, the feet $204_1$ and $204_2$ point to a direction 410, and the feet $204_3$ and $204_4$ point to a direction 420. In another example, the directions 410 and 420 are opposite to each other.

Figure 5:
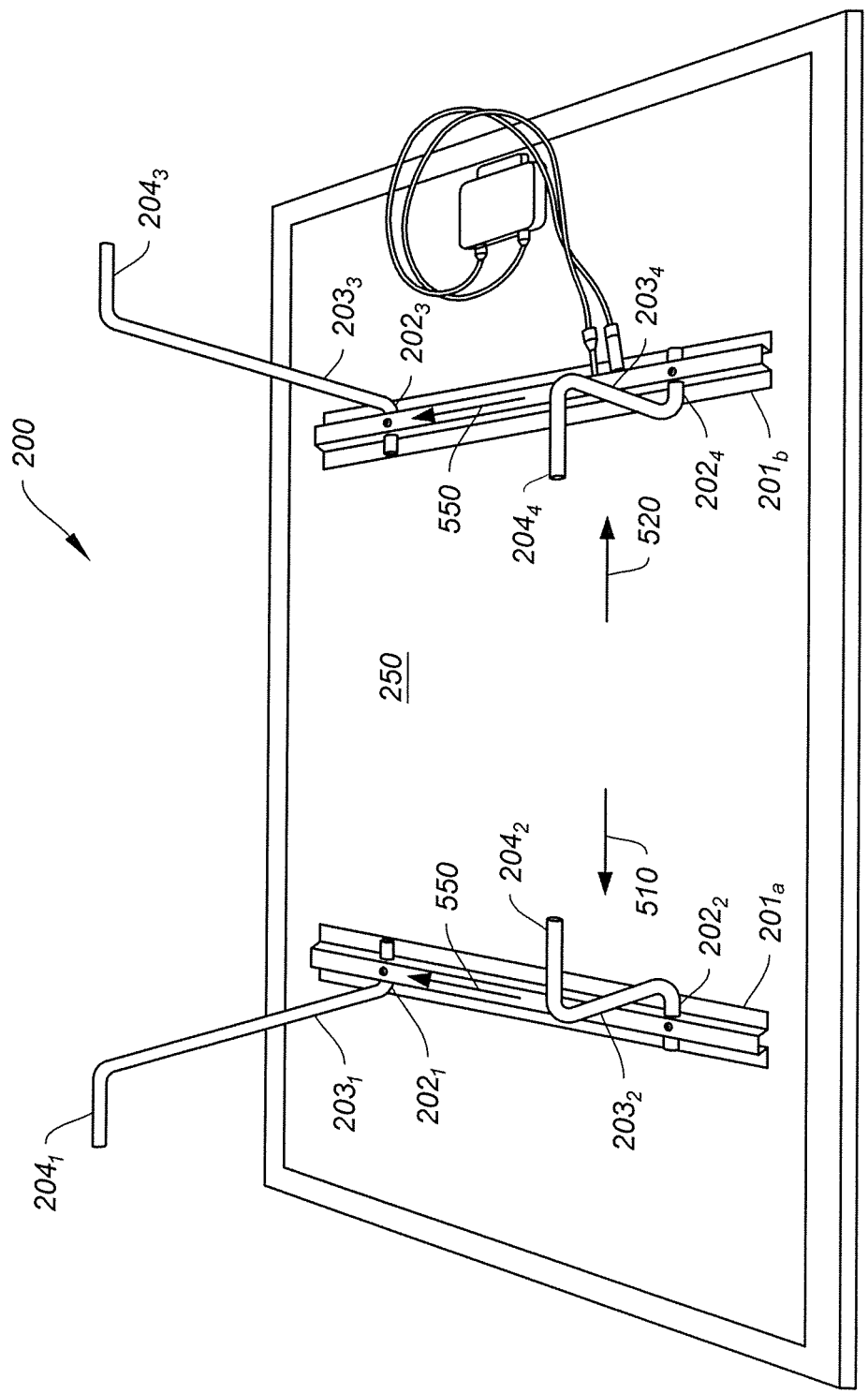
FIG. 5 is a simplified diagram showing the rotatable support system 200 for mounting one or more photovoltaic modules in an unfolded position according to yet another embodiment of the present invention.

FIG. 5 is a simplified diagram showing the rotatable support system 200 for mounting one or more photovoltaic modules in an unfolded position according to yet another embodiment of the present invention. This diagram is merely an example, which should not unduly limit the scope of the claims. One of ordinary skill in the art would recognize many variations, alternatives, and modifications.

As shown in FIG. 5, the rotatable support system 200 includes two stiffeners 201 and four spacers. For example, the rotatable support system 200 is configured to support the photovoltaic module 250 (e.g., a solar panel). In another example, each of the two stiffeners 201 is attached to two of the four spacers. In yet another example, each of the four spacers includes a rotatable component 202, a column 203, and a foot 204. In one embodiment, the column 203 and the foot 204 of the same spacer are configured to rotate about the axis of the rotatable component 202 that is attached to the corresponding stiffener 201. For example, the corresponding stiffener 201 extends in a direction 550, and the axis of the rotatable component 202 is perpendicular to the corresponding direction 550. In another embodiment, the column 203 and the foot 204 of the same spacer form an L shape. For example, the two feet 204 of the two spacers that are attached to the same stiffener 201 points to two different directions (e.g., opposite directions).

Also, as shown in FIG. 5, the two stiffeners 201 include the stiffener $201_a$ and the stiffener $201_b$. For example, the stiffener $201_a$ is attached to the two spacers, one of which includes the rotatable component $202_1$, the column $203_1$, and the foot $204_1$ and the other of which includes the rotatable component $202_2$, the column $203_2$, and the foot $204_2$. In another example, the stiffener $201_b$ is attached to the two spacers, one of which includes the rotatable component $202_3$, the column $203_3$, and the foot $204_3$ and the other of which includes the rotatable component $202_4$, the column $203_4$, and the foot $204_4$.

In one embodiment, the columns $203_1$, $203_2$, $203_3$, and $203_4$ correspond to a first maximum range of rotation, a second maximum range of rotation, a third maximum range of rotation, and a fourth maximum range of rotation, respectively. For example, the first maximum range of rotation and the third maximum range of rotation are the same in magnitude, and the second maximum range of rotation and the fourth maximum range of rotation are the same in magnitude. In another example, the first maximum range of rotation and the second maximum range of rotation are the same in magnitude, and the third maximum range of rotation and the fourth maximum range of rotation are the same in magnitude. In yet another example, the first maximum range of rotation and the second maximum range of rotation are different in magnitude, and the third maximum range of rotation and the fourth maximum range of rotation are different in magnitude.

In another embodiment, the columns $203_1$ and $203_2$ are different in length, the columns $203_3$ and $203_4$ are different in length, the columns $203_1$ and $203_3$ are the same in length, and the columns $203_2$ and $203_4$ are the same in length. In yet another embodiment, the column $203_1$ and the foot $204_1$ are configured to form a first L shape, the column $203_2$ and the foot $204_2$ are configured to form a second L shape, the column $203_3$ and the foot $204_3$ are configured to form a third L shape, and the column $203_4$ and the foot $204_4$ are configured to form a fourth L shape. For example, the feet $204_1$ and $204_4$ point to a direction 510, and the feet $204_2$ and $204_3$ point to a direction 520. In another example, the directions 510 and 520 are opposite to each other.

As discussed above and further emphasized here, FIGS. 4 and 5 are merely examples, which should not unduly limit the scope of the claims. One of ordinary skill in the art would recognize many variations, alternatives, and modifications. For example, the column $203_1$ and the foot $204_1$ are configured to form a first T shape, the column $203_2$ and the foot $204_2$ are configured to form a second T shape, the column $203_3$ and the foot $204_3$ are configured to form a third T shape, and the column $203_4$ and the foot $204_4$ are configured to form a fourth T shape.

FIG. 6A is a simplified diagram showing a top view of the stiffener 201, FIG. 6B is a simplified diagram showing a cross-section view of the stiffener 201, and FIG. 6C is a simplified diagram showing a side view of the stiffener 201 as part of the rotatable support system 200 for mounting one or more photovoltaic modules according to certain embodiments of the present invention. These diagrams are merely examples, which should not unduly limit the scope of the claims. One of ordinary skill in the art would recognize many variations, alternatives, and modifications.

As shown in FIG. 6B, the stiffener 201 includes sections 610, 612, 620, 622, and 630. For example, the section 620 is substantially perpendicular to the section 610, and the section 622 is substantially perpendicular to the section 612. In another example, the section 630 is substantially parallel with the sections 610 and 612. In yet another example, the sections 610 and 612 are configured to be in contact (e.g., in direct contact) with the photovoltaic module 250 (e.g., a solar panel), and the section 630 is configured to be located a distance (e.g., a distance 632) away from the photovoltaic module 250. As shown in FIG. 6A, the section 630 includes two holes 640 and 642, and as shown in FIG. 6C, the sections 620 and 622 each include two holes 650 and 652.

Figure 7A:
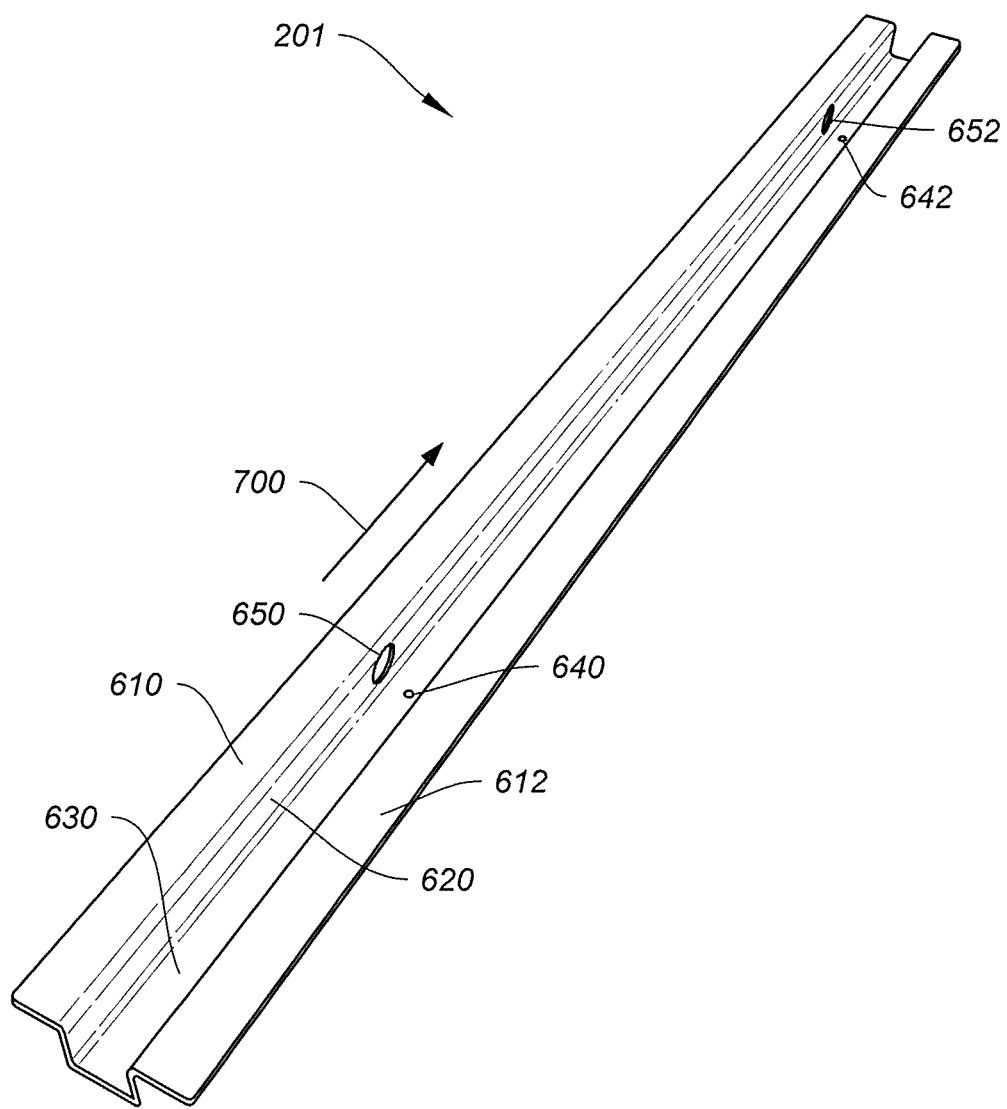
FIGS. 7A-7B are simplified diagrams showing the stiffener as part of the rotatable support system for mounting one or more photovoltaic modules according to some embodiments of the present invention.
Figure 7B:
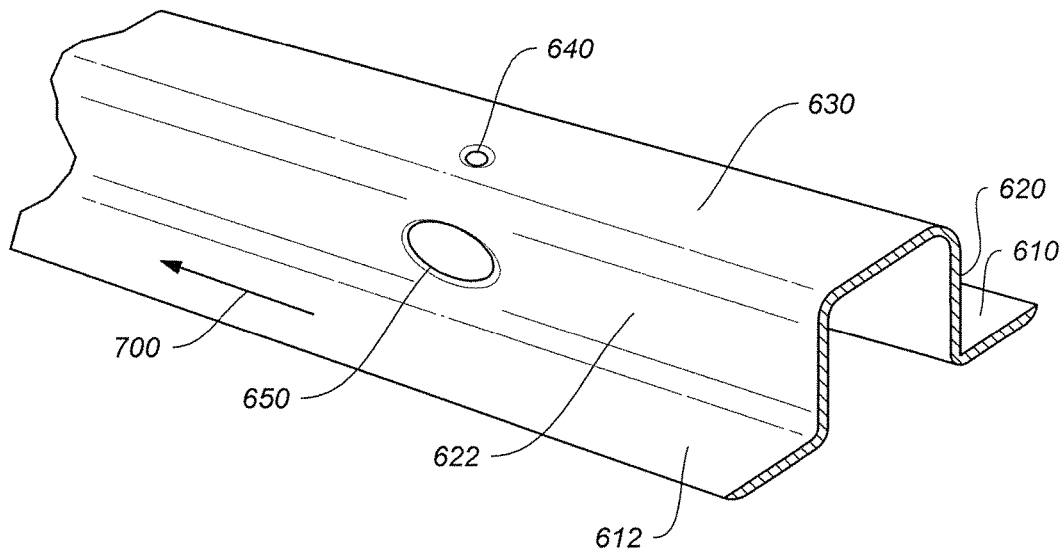

FIGS. 7A-7B are simplified diagrams showing the stiffener 201 as part of the rotatable support system 200 for mounting one or more photovoltaic modules according to some embodiments of the present invention. These diagrams are merely examples, which should not unduly limit the scope of the claims. One of ordinary skill in the art would recognize many variations, alternatives, and modifications.

As shown in FIGS. 7A-7B, the sections 610, 612, 620, 622, and 630 all extend in a direction 700. For example, the center of the hole 650 of the section 620, the center of the hole 640 of the section 630, and the center of the hole 650 of the section 622 are located substantially on a plane that is perpendicular to the direction 700. In another example, the center of the hole 652 of the section 620, the center of the hole 642 of the section 630, and the center of the hole 652 of the section 622 are located substantially on a plane that is perpendicular to the direction 700.

FIGS. 8A-8C are simplified diagrams showing side views of the spacer as part of the rotatable support system 200 for mounting one or more photovoltaic modules according to certain embodiments of the present invention, and FIGS. 9A-9C are simplified diagrams showing side views of the spacer as part of the rotatable support system 200 for mounting one or more photovoltaic modules according to some embodiments of the present invention. These diagrams are merely examples, which should not unduly limit the scope of the claims. One of ordinary skill in the art would recognize many variations, alternatives, and modifications.

As shown in FIGS. 8A-8C and/or FIGS. 9A-9C, each spacer includes the rotatable component 202, the column 203, and the foot 204. According to one embodiment, the rotatable component 202 is substantially parallel with the foot 204. For example, the column 203 is substantially perpendicular to the rotatable component 202 and the foot 204. According to another embodiment, each of the rotatable component 202, the column 203, and the foot 204 includes a hollow tube. For example, the rotatable component 202 includes a hollow tube with a groove 810.

FIG. 10 is a simplified diagram showing the groove 810 of the rotatable component 202 as part of the rotatable support system 200 for mounting one or more photovoltaic modules according to one embodiment of the present invention. This diagram is merely an example, which should not unduly limit the scope of the claims. One of ordinary skill in the art would recognize many variations, alternatives, and modifications. As shown in FIG. 9, the groove 810 has a length 1010 and a width 1020.

Referring to FIGS. 7A-7B, the rotatable component 202 is configured to be inserted into one of the hole 650 of the section 620 or the hole 650 of the section 622, and to extend through the other of the hole 650 of the section 620 or the hole 650 of the section 622 according to one embodiment. According to one embodiment, after the insertion, the groove 810 of the rotatable component 202 (e.g., the groove 810 of the hollow tube) is aligned with the hole 640 of the section 630. For example, the shank of a rivet is inserted through the hole 640 of the section 630 and the groove 810 of the rotatable component 202, and the rivet further includes a first head and a second head. In another example, the fully formed second head of the rivet is wider than the width 1020 of the groove 810, and the groove 810 and the hole 640 are confined between the first head and the second head of the rivet. As shown in FIG. 5, the spacer of the rotatable support system 200 is configured to rotate along the length 1010 of the groove 810, as further shown in FIG. 2A, FIG. 2B, and/or FIG. 3. For example, the length 1010 of the groove 810 corresponds to the maximum range of rotation for the column 203.

FIG. 11 is a simplified diagram showing the rotatable support system 200 for mounting one or more photovoltaic modules in a folded position according to yet another embodiment of the present invention. This diagram is merely an example, which should not unduly limit the scope of the claims. One of ordinary skill in the art would recognize many variations, alternatives, and modifications.

As shown in FIG. 11, the rotatable support system 200 includes two stiffeners 201 and two spacers. For example, the rotatable support system 200 is configured to support the photovoltaic module 250 (e.g., a solar panel). In another example, each of the two stiffeners 201 is attached to one of the two spacers. In yet another example, each of the two spacers includes a rotatable component 202, a column 203, and a foot 204. In one embodiment, the column 203 and the foot 204 of the same spacer are configured to rotate about the axis of the rotatable component 202 that is attached to the corresponding stiffener 201. For example, the corresponding stiffener 201 extends in a direction 1100, and the axis of the rotatable component 202 is parallel with the corresponding direction 1100. In another embodiment, the column 203 and the foot 204 of the same spacer form a T shape.

FIGS. 12A-12B are simplified diagrams showing the spacer as part of the rotatable support system 200 for mounting one or more photovoltaic modules according to certain embodiments of the present invention. These diagrams are merely examples, which should not unduly limit the scope of the claims. One of ordinary skill in the art would recognize many variations, alternatives, and modifications.

As shown in FIGS. 12A-12B, each spacer includes the rotatable component 202, the column 203, and the foot 204. For example, the rotatable component 202 includes a hole. In another example, the column 203 is substantially perpendicular to the foot 204. In yet another example, the column 203 and the foot 204 of the same spacer form a T shape. In yet another example, the spacer as shown in FIGS. 12A-12B is used as part of the rotatable support system 200 as shown in FIG. 11.

FIG. 13 shows simplified diagrams for various shapes of the stiffener 201 as part of the rotatable support system 200 for mounting one or more photovoltaic modules according to certain embodiments of the present invention. These diagrams are merely examples, which should not unduly limit the scope of the claims. One of ordinary skill in the art would recognize many variations, alternatives, and modifications.

In one embodiment, the shapes of the stiffener 201 include one or more ribs to distance material from the neutral axis of the photovoltaic module 250 (e.g., a solar panel). In another embodiment, the stiffener 201 provides sufficient stiffness to allow the photovoltaic module 250 (e.g., a solar panel) to endure mechanical loading without damage (e.g., without damage to the front glass or to the active material of the solar panel). In yet another embodiment, the stiffener 201 is thin in order to achieve high packing density. In yet another embodiment, the stiffener 201 extends from the back of the photovoltaic module 250 (e.g., a solar panel) by less than 50 mm, less than 35 mm, or less than 25 mm.

According to one embodiment, the photovoltaic module 250 (e.g., a solar panel) is supported by one, two, or more stiffeners 201. For example, the frame of the solar panel 250 serves as the stiffener 201. In another example, the one or more stiffeners 201 are attached to the frame of the solar panel 250. In yet another example, the one or more stiffeners 201 are attached to the solar panel 250 with one or more compliant materials. In one embodiment, the one or more compliant materials include silicone adhesive. In another embodiment, the one or more compliant materials are of sufficient thickness to take up differential thermal expansion between the solar panel 250 and the one or more stiffeners 201 and/or between the solar panel 250 and the substrate 206 at both high operating temperature (e.g., the maximum operating temperature) and low operating temperature (e.g., the minimum operating temperature) of the solar panel 250.

FIG. 14 shows simplified diagrams for various shapes of the column 203 as part of the rotatable support system 200 for mounting one or more photovoltaic modules according to some embodiments of the present invention. These diagrams are merely examples, which should not unduly limit the scope of the claims. One of ordinary skill in the art would recognize many variations, alternatives, and modifications. For example, the column 203 has sufficient buckling and tensile strength to support mechanical loads without damage to the photovoltaic module 250 (e.g., a solar panel) and/or to the columns 103. In another example, in the folded position, the column 203 do not extend beyond the height of the one or more stiffeners 201.

FIG. 15 shows simplified diagrams for various shapes of the foot 204 as part of the rotatable support system 200 for mounting one or more photovoltaic modules according to certain embodiments of the present invention. These diagrams are merely examples, which should not unduly limit the scope of the claims. One of ordinary skill in the art would recognize many variations, alternatives, and modifications. For example, the foot 204 has sufficient area to allow for bonds with the substrate 206 of sufficient strength to resist mechanical loads on the photovoltaic module 250 (e.g., a solar panel). In another example, if the foot 204 is attached to the substrate 206 with a design strength of 100 pounds per square inch (psi) and if the maximum mechanical force on each foot is 100 pounds, each foot 204 should be at least one square inch in size.

FIG. 16 is a simplified diagram showing a method for installing the photovoltaic module 250 using the rotatable support system 200 according to an embodiment of the present invention. This diagram is merely an example, which should not unduly limit the scope of the claims. One of ordinary skill in the art would recognize many variations, alternatives, and modifications. The method 1600 for installing the photovoltaic module 250 includes processes 1610, 1620, 1630, 1640, 1650, and 1660.

At the process 1610, one or more stiffeners 201 are attached to the photovoltaic module 250 (e.g., a solar panel). For example, a photovoltaic module is attached to the one or more stiffeners 201. At the process 1620, one or more spacers are attached to the one or more stiffeners 201. For example, each of the one or more spacers includes one or more rotatable components 202 (e.g., one or more rotating joints), one or more columns 203, and one or more feet 204. In another example, the one or more columns 203 are attached to the stiffener 201 through at least one or more rotatable components 202 respectively. In another example, each of the one or more spacers (e.g., each of the one or more columns 203) is placed in the folded position for shipping.

At the process 1630, the photovoltaic module 250 (e.g., a solar panel) is moved with the one or more stiffeners 201 and the one or more spacers to an installation location. For example, the photovoltaic module 250 (e.g., a solar panel) is moved with the rotatable support system 200 to the installation location.

At the process 1640, the one or more spacers are rotated from the folded position to the unfolded position. For example, each column 203 is rotated from the folded position to the unfolded position automatically by the weight of the column 203. In another example, each column 203 is rotated from the folded position towards the unfolded position and is stopped at the unfolded position separated from the folded position by an angle difference, the angle difference representing the maximum range of rotation for the column 203.

At the process 1650, the one or more feet 204 of each of the one or more spacers are attached to a substrate (e.g., the substrate 206). For example, each of the one or more feet 204 is inserted into a groove of the substrate of the substrate 206, and is attached to the substrate 206 within the groove. At the process 1660, the installation of the photovoltaic module 250 (e.g., a solar panel) is completed.

FIGS. 17A-17E are simplified diagrams showing the process 1640 of rotating one or more spacers from folded position to unfolded position and the process 1650 of attaching one or more feet of each of one or more spacers to substrate as parts of the method 1600 for installing the photovoltaic module 250 using the rotatable support system 200 according to certain embodiments of the present invention. These diagrams are merely examples, which should not unduly limit the scope of the claims. One of ordinary skill in the art would recognize many variations, alternatives, and modifications.

Figure 17A:
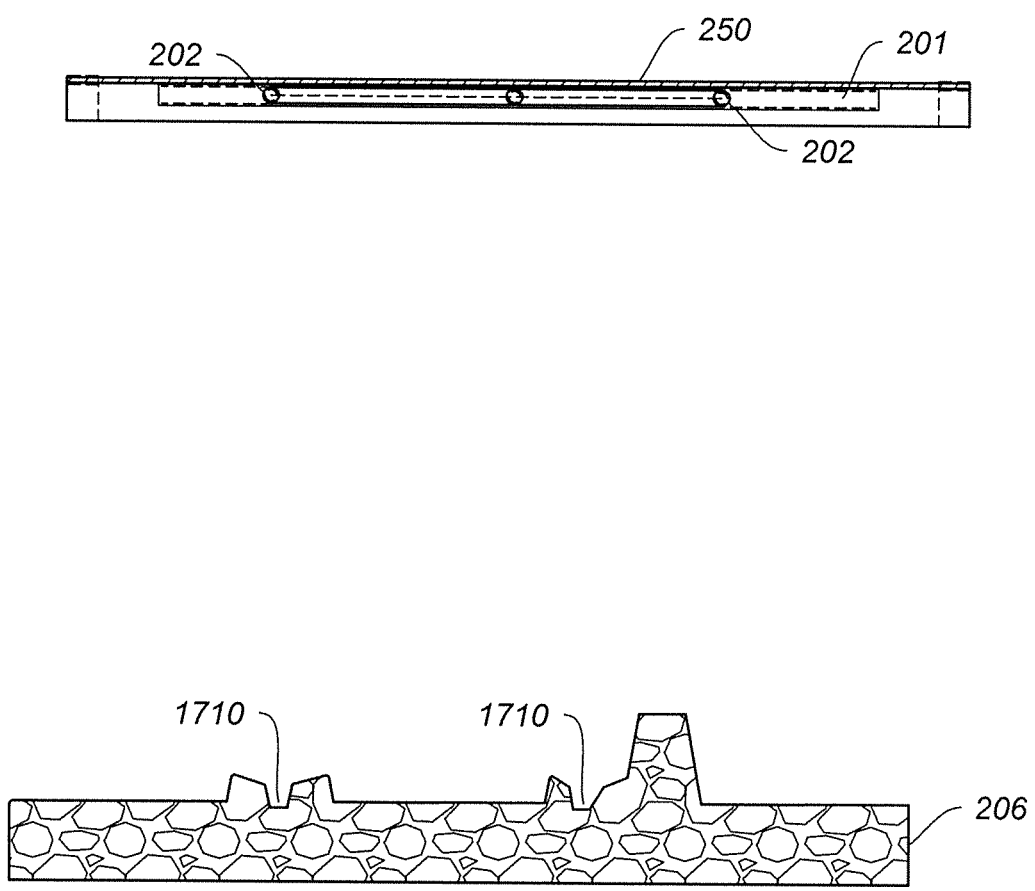
Figure 17B:
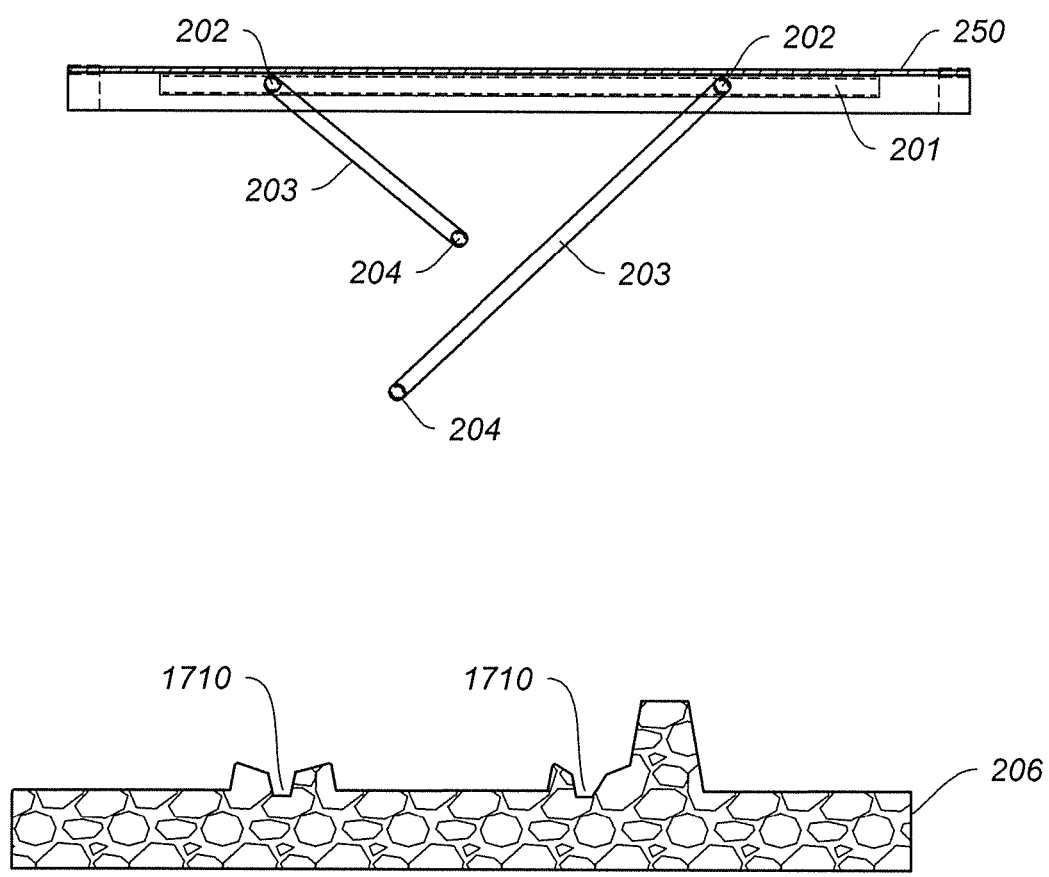
Figure 17C:
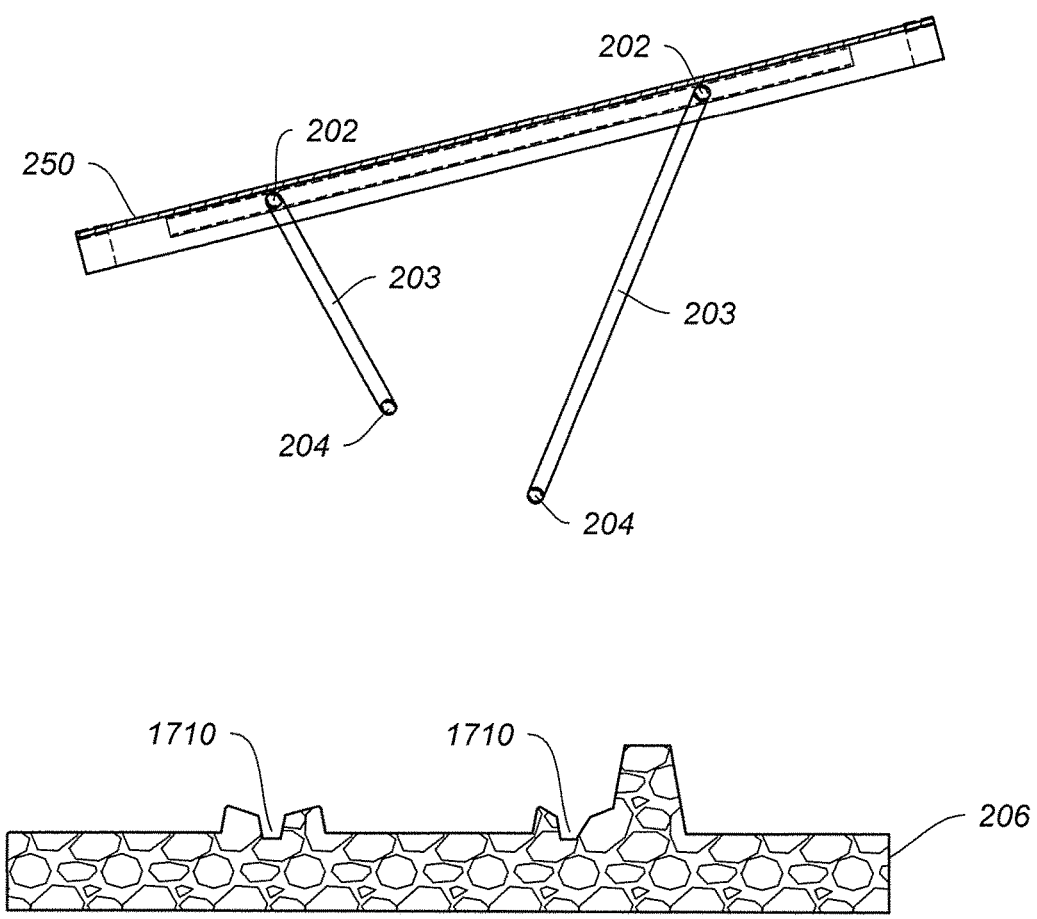
Figure 17D:
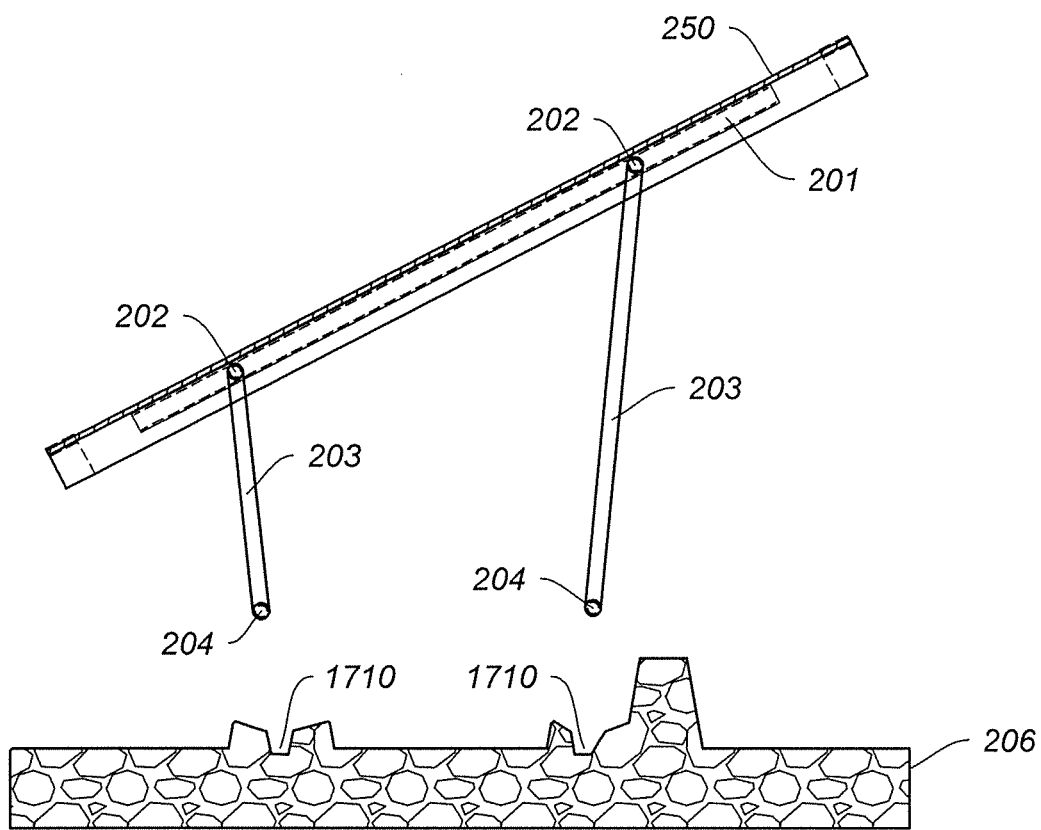
Figure 17E:
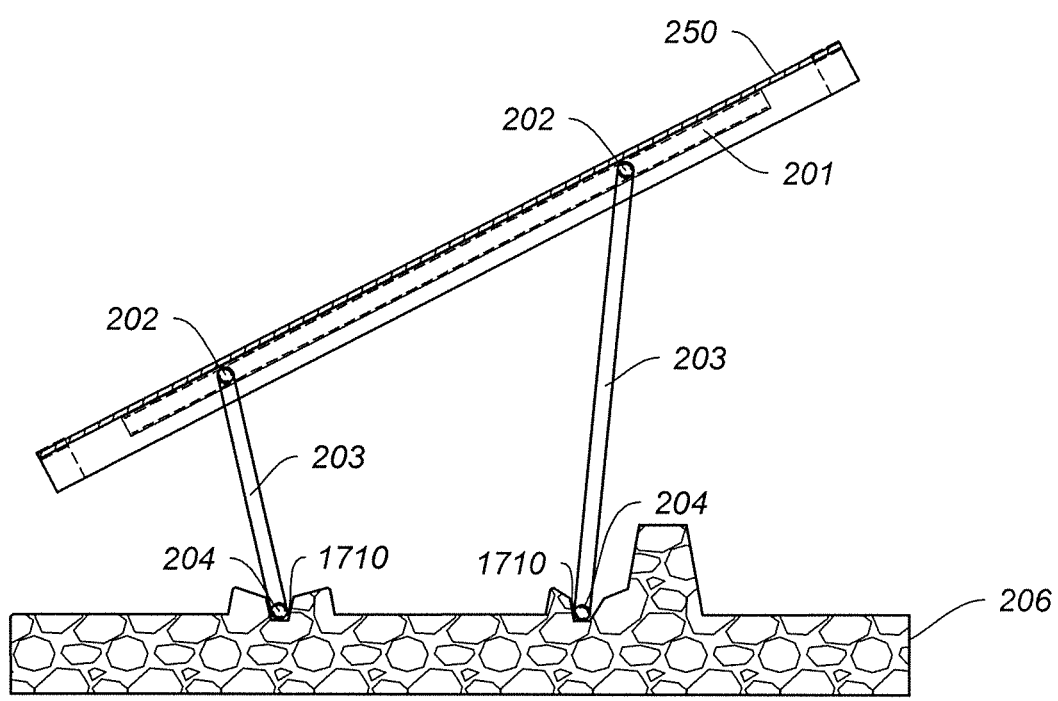

As shown in FIG. 17A, the photovoltaic module 250 (e.g., a solar panel) has arrived at an installation location with the one or more stiffeners 201 and the one or more spacers in the folded position for shipping. As shown in FIGS. 17B-17C, each of the one or more spacers rotates with the weight of the one or more corresponding columns 203 due to gravity. As shown in FIG. 17D, the rotation of each of the one or more spacers stops if the one or more corresponding columns 203 reach the predetermined positions (e.g., the predetermined angles with respect to the corresponding stiffener 201), respectively. As shown in FIG. 17E, for each of the one or more spacers, the one or more corresponding feet 204 are attached to the substrate 206. For example, the substrate 206 includes one or more grooves 1710, and each feet 204 is placed within a corresponding groove 1710 and attached to the substrate 206.

FIG. 18 is a simplified diagram showing the rotatable support system 200 for mounting one or more photovoltaic modules in a unfolded and mounted position according to yet another embodiment of the present invention. This diagram is merely an example, which should not unduly limit the scope of the claims. One of ordinary skill in the art would recognize many variations, alternatives, and modifications.

As shown in FIG. 18, the rotatable support system 200 includes one or more stiffeners 201 and at least four spacers. In one embodiment, the rotatable support system 200 is configured to support the photovoltaic module 250 (e.g., a solar panel). In another embodiment, each of the four spacers includes a rotatable component 202, a column 203, and a foot 204 according to one embodiment. For example, the columns 203 and the feet 204 have been rotated about the corresponding axes of the rotatable components 202 respectively. In another example, the feet 204 are attached to the substrate 206.

In yet another embodiment, the substrate 206 is an extruded concrete slab. For example, one or more features (e.g., one or more grooves) in the concrete slab 206 are configured to assist in locating the proper placement of the one or more columns 203 and/or the one or more feet 204 onto the substrate 206. In another example, one or more features (e.g., one or more grooves) in the concrete slab 206 are configured to provide additional surface area for construction adhesive in order to bond between the substrate 206 and the one or more feet 204. In yet another example, the one or more columns 203 and/or the one or more feet 204 are attached to the substrate 206 by pushing the one or more columns 203 and/or the one or more feet 204 into the pliable concrete of the substrate 206 before the pliable concrete hardens.

FIGS. 19A-19B are simplified diagrams showing the rotatable support system 200 for mounting one or more photovoltaic modules in a unfolded and mounted position as shown in FIG. 2B according to certain embodiments of the present invention. These diagram are merely examples, which should not unduly limit the scope of the claims. One of ordinary skill in the art would recognize many variations, alternatives, and modifications.

Some embodiments of the present invention provide a low profile, rotatable solar panel support system that can meet various requirements of a fixed-tilt solar panel mounting system while reducing installation labor and part count and also improving shipping convenience. For example, the rotatable solar panel support system is shipped to the installation location in a collapsed state, with one or more spacers nominally parallel with the panel and in the plane of the panel stiffeners. In another example, once at the installation location, the one or more spacers are rotated out of the plane of the panel stiffeners to provide support to the panel at the desired angle relative to the horizon. In yet another example, the one or more feet of the one or more spacers are subsequently secured to the base material and the panel installation is complete.

According to another embodiment, a rotatable support system for mounting one or more photovoltaic modules includes a stiffener configured to be attached to the one or more photovoltaic modules, a column connected to the stiffener through at least a rotatable component, and a foot connected to the column. The column is configured to rotate from a folded position towards an unfolded position, and stop at the unfolded position separated from the folded position by an angle difference. The angle difference represents the maximum range of rotation for the column. For example, the rotatable support system is implemented according to at least FIG. 2A, FIG. 2B, FIG. 3, FIG. 4, FIG. 5, FIG. 11, FIG. 18, FIG. 19A, and/or FIG. 19B.

According to yet another embodiment, a rotatable support system for mounting one or more photovoltaic modules includes a first stiffener configured to be attached to a photovoltaic module, a first column connected to the first stiffener through at least a first rotatable component, a first foot connected to the first column, a second column connected to the first stiffener through at least a second rotatable component, a second foot connected to the second column, a second stiffener configured to be attached to the photovoltaic module, a third column connected to the second stiffener through at least a third rotatable component, a third foot connected to the third column, a fourth column connected to the second stiffener through at least a fourth rotatable component, and a fourth foot connected to the fourth column. The first column is configured to rotate from a first folded position towards a first unfolded position, and stop at the first unfolded position separated from the first folded position by a first angle difference. The first angle difference represents the first maximum range of rotation for the first column. Additionally, the second column is configured to rotate from a second folded position towards the second unfolded position, and stop at the second unfolded position separated from the second folded position by a second angle difference. The second angle difference represents the second maximum range of rotation for the second column. Moreover, the third column is configured to rotate from a third folded position towards a third unfolded position, and stop at the third unfolded position separated from the third folded position by a third angle difference. The third angle difference represents the third maximum range of rotation for the third column. Also, the fourth column is configured to rotate from a fourth folded position towards a fourth unfolded position, and stop at the fourth unfolded position separated from the fourth folded position by a fourth angle difference. The fourth angle difference represents the fourth maximum range of rotation for the fourth column. The first column and the second column are different in length, the third column and the fourth column are different in length, the first column and the third column are the same in length, and the second column and the fourth column are the same in length. The first angle difference and the third angle difference are the same in magnitude, and the second angle difference and the fourth angle difference are the same in magnitude. For example, the rotatable support system is implemented according to at least FIG. 3, FIG. 4, FIG. 5, and/or FIG. 18.

According to yet another embodiment, a method for mounting one or more photovoltaic modules includes attaching a photovoltaic module to a stiffener. The stiffener is a part of a rotatable support system further including a column and a foot connected to the column. Additionally, the method includes attaching the column to the stiffener through at least a rotatable component, placing the column in a folded position, moving the photovoltaic module with the rotatable support system to an installation location, rotating the column from the folded position towards an unfolded position, and stopping the column at the unfolded position separated from the folded position by an angle difference. The angle difference represents the maximum range of rotation for the column. Moreover, the method includes attaching the foot to the substrate. For example, the method is implemented according to at least FIG. 16, and/or FIGS. 17A-17E.

Although specific embodiments of the present invention have been described, it will be understood by those of skill in the art that there are other embodiments that are equivalent to the described embodiments. For example, various embodiments and/or examples of the present invention can be combined. Accordingly, it is to be understood that the invention is not to be limited by the specific illustrated embodiments, but only by the scope of the appended claims.

What is claimed is:

1. A rotatable support system for mounting one or more photovoltaic modules, the system comprising:
   a substrate comprising a groove;
   a stiffener configured to be attached to the one or more photovoltaic modules;
   a column connected to the stiffener through at least a rotatable component; and
   a foot connected to the column;
   wherein the column is configured to:
      rotate from a folded position towards an unfolded position; and
      stop at the unfolded position separated from the folded position by an angle difference, the angle difference representing the maximum range of rotation for the column,
      the foot being insertable within the groove of the substrate and attachable to the substrate within the groove of the substrate when the column is in the unfolded position.

2. The rotatable support system of claim 1 wherein:
   the folded position corresponds to a first predetermined angle of the column with respect to the stiffener; and
   the unfolded position corresponds to a second predetermined angle of the column with respect to the stiffener, the second predetermined angle being different from the first predetermined angle by the angle difference.

3. The rotatable support system of claim 1 wherein the column is configured to rotate from the folded position to the unfolded position automatically by the weight of the column.

4. The rotatable support system of claim 1, and further comprising the rotatable component directly connected to the column.

5. The rotatable support system of claim 4 wherein the rotatable component includes a hollow tube with a groove, the groove of the hollow tube being related to a groove length and a groove width.

6. The rotatable support system of claim 5 wherein the column is configured to rotate from the folded position to the unfolded position along the groove length, the groove length corresponding to the maximum range of rotation for the column.

7. The rotatable support system of claim 5 wherein the stiffener includes:
   a first section configured to be attached to the one or more photovoltaic modules;
   a second section configured to be attached to the one or more photovoltaic modules;
   a third section including a first hole and located a distance away from the one or more photovoltaic modules, the third section being substantially parallel with the first section and the second section;
   a fourth section including a second hole and connecting the first section to the third section; and
   a fifth section including a third hole and connecting the second section to the third section.

8. The rotatable support system of claim 7 wherein the hollow tube is configured to pass through the second hole and the third hole with the groove of the hollow tube being aligned with the first hole.

9. The rotatable support system of claim 8 wherein the rotatable component further includes a rivet, the rivet including a shank, a first head, and a second head.

10. The rotatable support system of claim 9 wherein the shank is configured to pass through the first hole and the groove of the hollow tube, the first hole and the groove of the hollow tube being confined between the first head and the second head.

11. The rotatable support system of claim 1 wherein each of the one or more photovoltaic modules is a solar panel.

12. The rotatable support system of claim 1 wherein the foot includes a pad.

13. The rotatable support system of claim 1 wherein the column and the foot are configured to form a T shape.

14. The rotatable support system of claim 1 wherein the column and the foot are configured to form an L shape.

15. The system of claim 1, wherein the substrate comprises a concrete slab, the groove being within the concrete slab.

16. A rotatable support system for mounting one or more photovoltaic modules, the system comprising:
   a substrate comprising first and second grooves;
   a first stiffener configured to be attached to the one or more photovoltaic modules;
   a first column connected to the first stiffener through at least a first rotatable component;
   a first foot connected to the first column;
   a second column connected to the first stiffener through at least a second rotatable component;
   a second foot connected to the second column;
   a second stiffener configured to be attached to the photovoltaic module;
   a third column connected to the second stiffener through at least a third rotatable component;
   a third foot connected to the third column;
   a fourth column connected to the second stiffener through at least a fourth rotatable component;
   a fourth foot connected to the fourth column;
   wherein:
      the first column is configured to:
         rotate from a first folded position towards a first unfolded position; and
         stop at the first unfolded position separated from the first folded position by a first angle difference, the first angle difference representing the first maximum range of rotation for the first column,
         the foot of the first column being insertable within the first groove of the substrate and attachable to the substrate within the first groove of the substrate when the first column is in the unfolded position;
      the second column is configured to:
         rotate from a second folded position towards the second unfolded position; and
         stop at the second unfolded position separated from the second folded position by a second angle difference, the second angle difference representing the second maximum range of rotation for the second column,
         the foot of the second column being insertable within the second groove of the substrate and attachable to the substrate within the second groove of the substrate when the second column is in the unfolded position;
      the third column is configured to:
         rotate from a third folded position towards a third unfolded position; and stop at the third unfolded position separated from the third folded position by a third angle difference, the third angle difference representing the third maximum range of rotation for the third column, the foot of the third column being insertable within the first groove of the substrate and attachable to the substrate within the first groove of the substrate when the third column is in the unfolded position;

the fourth column is configured to:
  rotate from a fourth folded position towards a fourth unfolded position; and
  stop at the fourth unfolded position separated from the fourth folded position by a fourth angle difference, the fourth angle difference representing the fourth maximum range of rotation for the fourth column,
  the foot of the fourth column being insertable within the second groove of the substrate and attachable to the substrate within the second groove of the substrate when the fourth column is in the unfolded position;

wherein:
  the first column and the second column are different in length;
  the third column and the fourth column are different in length;
  the first column and the third column are the same in length; and
  the second column and the fourth column are the same in length;

wherein:
  the first angle difference and the third angle difference are the same in magnitude; and
  the second angle difference and the fourth angle difference are the same in magnitude.

17. The rotatable support system of claim 16 wherein:
the first angle difference and the second angle difference are the same in magnitude; and
the third angle difference and the fourth angle difference are the same in magnitude.

18. The rotatable support system of claim 16 wherein:
the first angle difference and the second angle difference are different in magnitude; and
the third angle difference and the fourth angle difference are different in magnitude.

19. The rotatable support system of claim 16 wherein:
the first column and the first foot are configured to form a first L shape;
the second column and the second foot are configured to form a second L shape;
the third column and the third foot are configured to form a third L shape; and
the fourth column and the fourth foot are configured to form a fourth L shape.

20. The rotatable support system of claim 16 wherein:
the first foot and the second foot are configured to point to a first direction;
the third foot and the fourth foot are configured to point to a second direction;
the first direction and the second direction are opposite to each other.

21. The rotatable support system of claim 16 wherein:
the first foot and the fourth foot are configured to point to a first direction;
the second foot and the third foot are configured to point to a second direction;
the first direction and the second direction are opposite to each other.

22. The rotatable support system of claim 16 wherein:
the first column and the first foot are configured to form a first T shape;
the second column and the second foot are configured to form a second T shape;
the third column and the third foot are configured to form a third T shape; and
the fourth column and the fourth foot are configured to form a fourth T shape.

23. The rotatable support system of claim 16, and further comprising:
the first rotatable component directly connected to the first column;
the second rotatable component directly connected to the second column;
the third rotatable component directly connected to the third column; and
the fourth rotatable component directly connected to the fourth column.

24. The rotatable support system of claim 16 wherein the photovoltaic module is a solar panel.

25. The system of claim 16, wherein the substrate comprises a concrete slab.

26. The system of claim 25, wherein the first and second grooves are within the concrete slab.

* * * * *